(12) United States Patent
Seok

(10) Patent No.: US 11,109,408 B2
(45) Date of Patent: *Aug. 31, 2021

(54) METHOD AND DEVICE FOR UPLINK TRANSMISSION

(71) Applicant: TECHFLUX, INC., Seojong-si (KR)

(72) Inventor: Yong Ho Seok, Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/543,456

(22) Filed: Aug. 16, 2019

(65) Prior Publication Data

US 2021/0051714 A1 Feb. 18, 2021

(51) Int. Cl.
*H04W 74/08* (2009.01)
*H04W 80/08* (2009.01)
*H04L 27/26* (2006.01)
*H04W 72/04* (2009.01)
*H04L 5/00* (2006.01)

(52) U.S. Cl.
CPC ..... *H04W 74/0808* (2013.01); *H04L 27/2614* (2013.01); *H04W 72/0446* (2013.01); *H04W 80/08* (2013.01); *H04L 5/0007* (2013.01)

(58) Field of Classification Search
CPC . H04L 5/0064; H04L 27/2613; H04L 5/0028; H04L 27/2601; H04L 69/324; H04L 5/0044; H04L 27/2628; H04L 5/0037; H04L 27/2035; H04L 27/2602; H04L 5/0023; H04L 27/2614; H04L 27/26; H04L 29/08; H04W 74/0816; H04W 84/12; H04W 74/08
USPC .......................................................... 370/329
See application file for complete search history.

(56) References Cited

U.S. PATENT DOCUMENTS

| 7,054,296 | B1 | 5/2006 | Sorrells et al. |
| 8,089,901 | B2 | 1/2012 | Yonge, III et al. |
| 8,339,978 | B2 | 12/2012 | Sawai et al. |
| 8,339,983 | B2 | 12/2012 | Kwon et al. |
| 8,416,707 | B2 | 4/2013 | Kwon et al. |
| 8,451,743 | B2 | 5/2013 | Kwon et al. |
| 8,531,980 | B2 | 9/2013 | Park et al. |
| 8,537,705 | B2 | 9/2013 | Afkhamie et al. |
| 8,553,576 | B2 | 10/2013 | Park |
| 8,614,961 | B1 | 12/2013 | Katar et al. |
| 8,687,572 | B2 | 4/2014 | Park |
| 8,711,771 | B2 | 4/2014 | Das et al. |
| 8,767,570 | B2 | 7/2014 | Ong et al. |
| 8,787,341 | B2 | 7/2014 | Sohn et al. |
| 8,824,266 | B2 | 9/2014 | Kwon |
| 8,879,523 | B2 | 11/2014 | Fischer et al. |
| 8,885,535 | B2 | 11/2014 | Fischer et al. |
| 8,886,755 | B1 | 11/2014 | Liu et al. |

(Continued)

FOREIGN PATENT DOCUMENTS

| CA | 2734138 C | 8/2016 |
| CN | 1462523 A | 12/2003 |

(Continued)

*Primary Examiner* — Man U Phan

(57) ABSTRACT

A method for transmitting data in a wireless local area network and the device using the same are provided. The method includes steps to transmit a request frame from an access point (AP) to a plurality of stations. The stations respond by transmitting physical layer protocol data units (PPDUs) in response to the request frame. The request frame and the responsive PPDU's are uniquely structured to increase communication efficiency.

10 Claims, 15 Drawing Sheets

(56) References Cited

U.S. PATENT DOCUMENTS

| | | | |
|---|---|---|---|
| 8,897,298 B2 | 11/2014 | Wentink | |
| 8,913,510 B2 | 12/2014 | Gong et al. | |
| 8,917,705 B2 | 12/2014 | Merlin et al. | |
| 8,923,144 B2 | 12/2014 | Shao et al. | |
| 8,923,146 B2 | 12/2014 | Ong et al. | |
| 8,942,123 B2 | 1/2015 | Merlin et al. | |
| 8,964,618 B2 | 2/2015 | Seok | |
| 8,989,102 B2 | 3/2015 | Kenney et al. | |
| 9,001,797 B2 | 4/2015 | Wentink | |
| 9,014,105 B2 | 4/2015 | Chu et al. | |
| 9,025,428 B2 | 5/2015 | Jones, IV et al. | |
| 9,025,544 B2 * | 5/2015 | Kim | H04W 28/26 370/329 |
| 9,107,222 B2 * | 8/2015 | Seok | H04W 4/20 |
| 9,203,586 B2 * | 12/2015 | You | H04W 72/046 |
| 9,526,114 B2 * | 12/2016 | Seok | H04W 4/20 |
| 9,544,916 B2 * | 1/2017 | Park | H04W 48/08 |
| 9,788,346 B2 * | 10/2017 | Seok | H04W 74/0816 |
| 9,807,682 B2 * | 10/2017 | Kim | H04L 1/0079 |
| 9,860,877 B2 * | 1/2018 | Noh | H04B 7/0413 |
| 10,075,976 B2 * | 9/2018 | Hart | H04W 74/0808 |
| 10,405,301 B2 * | 9/2019 | Noh | H04W 72/042 |
| 10,499,431 B2 * | 12/2019 | Seok | H04W 4/20 |
| 10,542,526 B2 * | 1/2020 | Seok | H04W 74/00 |
| 10,764,924 B2 * | 9/2020 | Ko | H04W 84/12 |
| 2002/0188723 A1 | 12/2002 | Choi et al. | |
| 2003/0055881 A1 | 3/2003 | Ngo | |
| 2005/0025182 A1 | 2/2005 | Nazari | |
| 2006/0073791 A1 | 4/2006 | Senarath et al. | |
| 2007/0060155 A1 | 3/2007 | Kahana et al. | |
| 2008/0019373 A1 | 1/2008 | Filipovich et al. | |
| 2008/0274760 A1 | 11/2008 | Senarath et al. | |
| 2009/0262688 A1 | 10/2009 | Tsai et al. | |
| 2010/0111005 A1 | 5/2010 | Ahn et al. | |
| 2011/0255570 A1 | 10/2011 | Fujiwara | |
| 2012/0155295 A1 | 6/2012 | Trainin | |
| 2012/0177144 A1 | 7/2012 | Lee et al. | |
| 2012/0214523 A1 | 8/2012 | Senarath et al. | |
| 2012/0224481 A1 | 9/2012 | Babiarz | |
| 2012/0224483 A1 | 9/2012 | Babiarz | |
| 2012/0224484 A1 | 9/2012 | Babiarz | |
| 2012/0243454 A1 | 9/2012 | Hwang et al. | |
| 2012/0320856 A1 | 12/2012 | Kim et al. | |
| 2013/0128807 A1 | 5/2013 | Vermani et al. | |
| 2013/0155980 A1 | 6/2013 | Hassan et al. | |
| 2013/0173067 A1 | 7/2013 | Kaneko et al. | |
| 2013/0308580 A1 | 11/2013 | Park et al. | |
| 2014/0056192 A1 | 2/2014 | Meylan et al. | |
| 2014/0126509 A1 | 5/2014 | You | |
| 2014/0192662 A1 | 7/2014 | Chetlur et al. | |
| 2015/0139137 A1 | 5/2015 | Seok | |
| 2015/0237631 A1 | 8/2015 | Noh | |
| 2015/0264713 A1 | 9/2015 | Amemiya | |
| 2015/0341130 A1 | 11/2015 | Zhou et al. | |
| 2016/0157264 A1 | 6/2016 | Wang et al. | |
| 2016/0173243 A1 | 6/2016 | Hassan et al. | |
| 2017/0041952 A1 | 2/2017 | Kim | |

FOREIGN PATENT DOCUMENTS

| | | |
|---|---|---|
| CN | 1-617693 A | 5/2005 |
| CN | 1791043 A | 6/2006 |
| CN | 1992978 A | 7/2007 |
| CN | 101369884 A | 2/2009 |
| CN | 102577207 A | 7/2012 |
| CN | 103229582 A | 7/2013 |
| CN | 104066145 A | 9/2014 |
| CN | 104081858 A | 10/2014 |
| CN | 105307279 A | 2/2016 |
| CN | 105309033 A | 2/2016 |
| CN | 105337705 A | 2/2016 |
| CN | 105474569 A | 4/2016 |
| CN | 105594241 A | 5/2016 |
| EP | 01089498 A2 | 4/2001 |
| EP | 1393502 A2 | 3/2004 |
| EP | 1804424 A1 | 7/2007 |
| EP | 01804427 A1 | 7/2007 |
| JP | 2016503998 A | 2/2016 |
| KR | 1020030017618 A | 3/2003 |
| WO | WO-02093839 A2 | 11/2002 |
| WO | WO-2013191447 A1 | 12/2013 |

* cited by examiner

FIG. 5

| L-STF (+j) | L-LTF (+j) | L-SIG (+j) | HEW-SIGA (+j) | HEW-STF (-1) | HEW-LTF (-1) | HEW-LTF (-1) | ...... | HEW-SIGB(-1) |
|---|---|---|---|---|---|---|---|---|
| | | | | HEW-STF (-1) | HEW-LTF (-1) | HEW-LTF (-1) | ...... | HEW-SIGB(-1) |
| | | | | HEW-STF (-1) | HEW-LTF (-1) | HEW-LTF (-1) | ...... | HEW-SIGB(-1) |
| | | | | HEW-STF (+1) | HEW-LTF (+1) | HEW-LTF (+1) | ...... | HEW-SIGB(+1) |
| L-STF (+1) | L-LTF (+1) | L-SIG (+1) | HEW-SIGA (+1) | HEW-STF (-1) | HEW-LTF (-1) | HEW-LTF (-1) | ...... | HEW-SIGB(-1) |
| | | | | HEW-STF (-1) | HEW-LTF (-1) | HEW-LTF (-1) | ...... | HEW-SIGB(-1) |
| | | | | HEW-STF (-1) | HEW-LTF (-1) | HEW-LTF (-1) | ...... | HEW-SIGB(-1) |
| | | | | HEW-STF (+1) | HEW-LTF (+1) | HEW-LTF (+1) | ...... | HEW-SIGB(+1) |

FIG. 6

| | | | | HEW-STF (-1) | HEW-LTF (-1) | HEW-LTF (-1) | ..... | HEW-SIGB(-1) |
|---|---|---|---|---|---|---|---|---|
| L-STF (-1) | L-LTF (-1) | L-SIG (-1) | HEW-SIGA (-1) | HEW-STF (-1) | HEW-LTF (-1) | HEW-LTF (-1) | ..... | HEW-SIGB(-1) |
| | | | | HEW-STF (-1) | HEW-LTF (-1) | HEW-LTF (-1) | ..... | HEW-SIGB(-1) |
| | | | | HEW-STF (+1) | HEW-LTF (+1) | HEW-LTF (+1) | ..... | HEW-SIGB(+1) |
| | | | | HEW-STF (-1) | HEW-LTF (-1) | HEW-LTF (-1) | ..... | HEW-SIGB(-1) |
| L-STF (-1) | L-LTF (-1) | L-SIG (-1) | HEW-SIGA (-1) | HEW-STF (-1) | HEW-LTF (-1) | HEW-LTF (-1) | ..... | HEW-SIGB(-1) |
| | | | | HEW-STF (-1) | HEW-LTF (-1) | HEW-LTF (-1) | ..... | HEW-SIGB(-1) |
| | | | | HEW-STF (+1) | HEW-LTF (+1) | HEW-LTF (+1) | ..... | HEW-SIGB(+1) |
| | | | | HEW-STF (-1) | HEW-LTF (-1) | HEW-LTF (-1) | ..... | HEW-SIGB(-1) |
| L-STF (-1) | L-LTF (-1) | L-SIG (-1) | HEW-SIGA (-1) | HEW-STF (-1) | HEW-LTF (-1) | HEW-LTF (-1) | ..... | HEW-SIGB(-1) |
| | | | | HEW-STF (-1) | HEW-LTF (-1) | HEW-LTF (-1) | ..... | HEW-SIGB(-1) |
| | | | | HEW-STF (+1) | HEW-LTF (+1) | HEW-LTF (+1) | ..... | HEW-SIGB(+1) |
| | | | | HEW-STF (-1) | HEW-LTF (-1) | HEW-LTF (-1) | ..... | HEW-SIGB(-1) |
| L-STF (+1) | L-LTF (+1) | L-SIG (+1) | HEW-SIGA (+1) | HEW-STF (-1) | HEW-LTF (-1) | HEW-LTF (-1) | ..... | HEW-SIGB(-1) |
| | | | | HEW-STF (-1) | HEW-LTF (-1) | HEW-LTF (-1) | ..... | HEW-SIGB(-1) |
| | | | | HEW-STF (+1) | HEW-LTF (+1) | HEW-LTF (+1) | ..... | HEW-SIGB(+1) |

| RTS (AC_VO) (STA2->STA1) (-1) | CTS (AC_VO) (STA1->STA3) (-1) | L-STF (+j) | L-LTF (+j) | L-SIG (+j) | HEW-SIGA (+j) | HEW-STF (-1) | HEW-LTF (-1) | HEW-LTF (-1) | | HEW-SIGB(-1) | PSDU (STA3->STA1) (AC_VO) |
|---|---|---|---|---|---|---|---|---|---|---|---|
| | | | | | | HEW-STF (-1) | HEW-LTF (-1) | HEW-LTF (-1) | — | HEW-SIGB(-1) | |
| | | | | | | HEW-STF (-1) | HEW-LTF (-1) | HEW-LTF (-1) | — | HEW-SIGB(-1) | |
| | | | | | | HEW-STF (+1) | HEW-LTF (+1) | HEW-LTF (+1) | — | HEW-SIGB(+1) | |
| RTS (AC_VO) (STA2->STA1) (-1) | CTS (AC_VO) (STA1->STA3) (-1) | L-STF (+1) | L-LTF (+1) | L-SIG (+1) | HEW-SIGA (+1) | HEW-STF (-1) | HEW-LTF (-1) | HEW-LTF (-1) | — | HEW-SIGB(-1) | PSDU (STA3->STA1) (AC_VO) |
| | | | | | | HEW-STF (-1) | HEW-LTF (-1) | HEW-LTF (-1) | — | HEW-SIGB(-1) | |
| | | | | | | HEW-STF (-1) | HEW-LTF (-1) | HEW-LTF (-1) | — | HEW-SIGB(-1) | |
| | | | | | | HEW-STF (+1) | HEW-LTF (+1) | HEW-LTF (+1) | — | HEW-SIGB(+1) | |
| RTS (AC_VO) (STA2->STA1) (-1) | CTS (AC_VO) (STA1->STA2) (-1) | L-STF (+j) | L-LTF (+j) | L-SIG (+j) | HEW-SIGA (+j) | HEW-STF (-1) | HEW-LTF (-1) | HEW-LTF (-1) | — | HEW-SIGB(-1) | PSDU (STA2->STA1) (AC_VO) |
| | | | | | | HEW-STF (-1) | HEW-LTF (-1) | HEW-LTF (-1) | — | HEW-SIGB(-1) | |
| | | | | | | HEW-STF (-1) | HEW-LTF (-1) | HEW-LTF (-1) | — | HEW-SIGB(-1) | |
| | | | | | | HEW-STF (+1) | HEW-LTF (+1) | HEW-LTF (+1) | — | HEW-SIGB(+1) | |
| RTS (AC_VO) (STA2->STA1) (+1) | CTS (AC_VO) (STA1->STA2) (+1) | L-STF (+1) | L-LTF (+1) | L-SIG (+1) | HEW-SIGA (+1) | HEW-STF (-1) | HEW-LTF (-1) | HEW-LTF (-1) | — | HEW-SIGB(-1) | PSDU (STA2->STA1) (AC_VO) |
| | | | | | | HEW-STF (-1) | HEW-LTF (-1) | HEW-LTF (-1) | — | HEW-SIGB(-1) | |
| | | | | | | HEW-STF (-1) | HEW-LTF (-1) | HEW-LTF (-1) | — | HEW-SIGB(-1) | |
| | | | | | | HEW-STF (+1) | HEW-LTF (+1) | HEW-LTF (+1) | — | HEW-SIGB(+1) | |

METHOD AND DEVICE FOR UPLINK TRANSMISSION

CROSS-REFERENCE TO RELATED APPLICATIONS

The present application is a continuation application of U.S. application Ser. No. 15/671,635 having a U.S. filing date of Aug. 8, 2017, now U.S. Pat. No. 10,412,763. The U.S. application Ser. No. 15/671,635, in turn, is a Continuation Application of U.S. application Ser. No. 15/390,619 having a U.S. filing date of Dec. 26, 2016, now U.S. Pat. No. 9,730,247. The U.S. application Ser. No. 15/390,619 is a Continuation Application (Bypass Continuation Application) of international application PCT/IB2015/001825 having an international filing date of 26 Jun. 2015 and designating the United States, the international application claiming priority to earlier filed Korean patent application 10-2014-0080173 filed on Jun. 27, 2014. The entire contents of all these prior applications and granted patents are incorporated herein by reference. The applicant claims the benefit of and claims priory herein to all these applications and granted patents and their filing dates and priority dates.

BACKGROUND OF THE INVENTION

Field of the Invention

The present invention relates to wireless communications, and more particularly, to a method for transmitting data in a wireless local area network and a device using the same.

Related Art

Institute of Electrical and Electronics Engineers (IEEE) 802.11n standard established in 2009 provides a transfer rate of up to 600 Mbps at a frequency band of 2.4 GHz or 5 GHz on the basis of Multiple Input Multiple Output (MIMO) technique.

IEEE 802.11ac standard established in 2013 aims to provide a throughput greater than or equal to 1 Gbps utilizing Medium Access Control (MAC) Service Access Point (SAP) layer scheme at a frequency band less than or equal to 6 GHz. A system supporting IEEE 802.11ac standard is referred to as a Very High Throughput (VHT) system.

There are continuing efforts to implement more effective Wireless Local Area Network (WLAN) technologies in increasingly congested environments.

SUMMARY OF THE INVENTION

The present invention provides a method for transmitting data in a wireless local area network. The present invention also provides a device for transmitting data in a wireless local area network.

In one aspect of the present invention, a method for communicating in a local area network is provided. The method includes a step of transmitting, at an access point (AP), a request frame to a plurality of stations, the request frame transmitted at a first instant. The request frame requests the plurality of stations to transmit a physical layer protocol data units (PPDUs) in response to the request frame, the request frame including a clear channel assessment (CCA) signal, the CCA signal instructing each station to perform CCA before transmitting its responsive PPDU. The method includes a second step of receiving, at the AP, the plurality of responsive PPDUs from the plurality of stations, each responsive PPDU received over sub-channels for which CCA were performed within a predetermined period of time following the first instant. Each responsive PPDU is generated based on an access category (AC) selected by its transmitting station.

For the plurality of responsive PDUS, a transmission opportunity (TXOP) is restricted by a TXOP limit of a primary AC that is used to gain access to at least one sub-channel. When any one of the CCA tested sub-channels is not idle, a responsive PPDU is not transmitted. Each sub-channel may have a bandwidth of 20 MHz. The request frame includes information indicating at least one sub-channel over which CCA is to be performed. The predetermined period of time is at least equal to an inter frame space (IFS).

In another aspect of the present invention, a device used for communicating in a local area is provided. The device includes a processor and memory disposed to the processor. The memory includes instructions that, when executed by the processor, causes the device to transmit a request frame to a plurality of stations, the request frame transmitted at a first instant. The request frame requests the plurality of stations to transmit a physical layer protocol data units (PPDUs) in response to the request frame, the request frame including a clear channel assessment (CCA) signal, the CCA signal instructing each station to perform CCA before transmitting its responsive PPDU. The memory includes instructions that, when executed by the processor, causes the device to receive the plurality of responsive PPDUs from the plurality of stations. Each responsive PPDU are received over sub-channels for which CCA were performed by a corresponding station within a predetermined period of time following the first instant. Each responsive PPDU is generated based on an access category (AC) selected by its transmitting station.

For the plurality of responsive PDUS, a transmission opportunity (TXOP) is restricted by a TXOP limit of a primary AC that is used to gain access to at least one sub-channel. When any one of the CCA tested sub-channels is not idle, a responsive PPDU is not transmitted. Each sub-channel may have a bandwidth of 20 MHz. The request frame includes information indicating at least one sub-channel over which CCA is to be performed. The predetermined period of time is at least equal to an inter frame space (IFS).

Using these inventive methods and devices, a greater amount of data can be transmitted during a same time period; thus, transmission efficiency is increased. In addition, a Peak-to-Average Power Ratio (PAPR) of a transmitter can be decreased.

BRIEF DESCRIPTION OF THE DRAWINGS

FIG. 5 shows an HEW PPDU format in a 20 MHz channel.

FIG. 6 shows an HEW PPDU format in a 40 MHz channel.

FIG. 7 shows an HEW PPDU format in an 80 MHz channel.

FIG. 8 shows a PPDU format according to another embodiment of the present invention.

FIG. 10 shows an example of PPDU transmission having an RTS/CTS bandwidth signal.

FIG. 12 shows an example of HEW PPDU transmission having an RTS/CTS bandwidth signal.

DESCRIPTION OF EXEMPLARY EMBODIMENTS

The proposed wireless local area network (WLAN) system may operate at a band less than or equal to 6 GHz or at a band of 60 GHz. The operating band less than or equal to 6 GHz may include at least one of 2.4 GHz and 5 GHz.

For clarity, a system complying with the Institute of Electrical and Electronics Engineers (IEEE) 802.11 a/g standard is referred to as a non-High Throughput (non-HT) system, a system complying with the IEEE 802.11n standard is referred to as a High Throughput (HT) system, and a system complying with IEEE 802.11ac standard is referred to as a Very High Throughput (VHT) system. In comparison thereto, a WLAN system complying with the proposed method is referred to as a High Efficiency WLAN (HEW) system. A WLAN system supporting systems used before the HEW system is released is referred to as a legacy system. The HEW system may include an HEW Station (STA) and an HEW Access Point (AP). The term HEW is only for the purpose of distinguishing from the conventional WLAN, and there is no restriction thereon. The HEW system may support IEEE 802.11/a/g/n/ac by providing backward compatibility in addition to the proposed method.

Hereinafter, unless a function of a station (STA) is additionally distinguished from a function of an Access Point (AP), the STA may include a non-AP STA and/or the AP. When it is described as an STA-to-AP communication, the STA may be expressed as the non-AP STA, and may correspond to communication between the non-AP STA and the AP. When it is described as STA-to-STA communication or when a function of the AP is not additionally required, the STA may be the non-AP STA or the AP.

A Physical layer Protocol Data unit (PPDU) is a data unit for data transmission.

Figure 1:
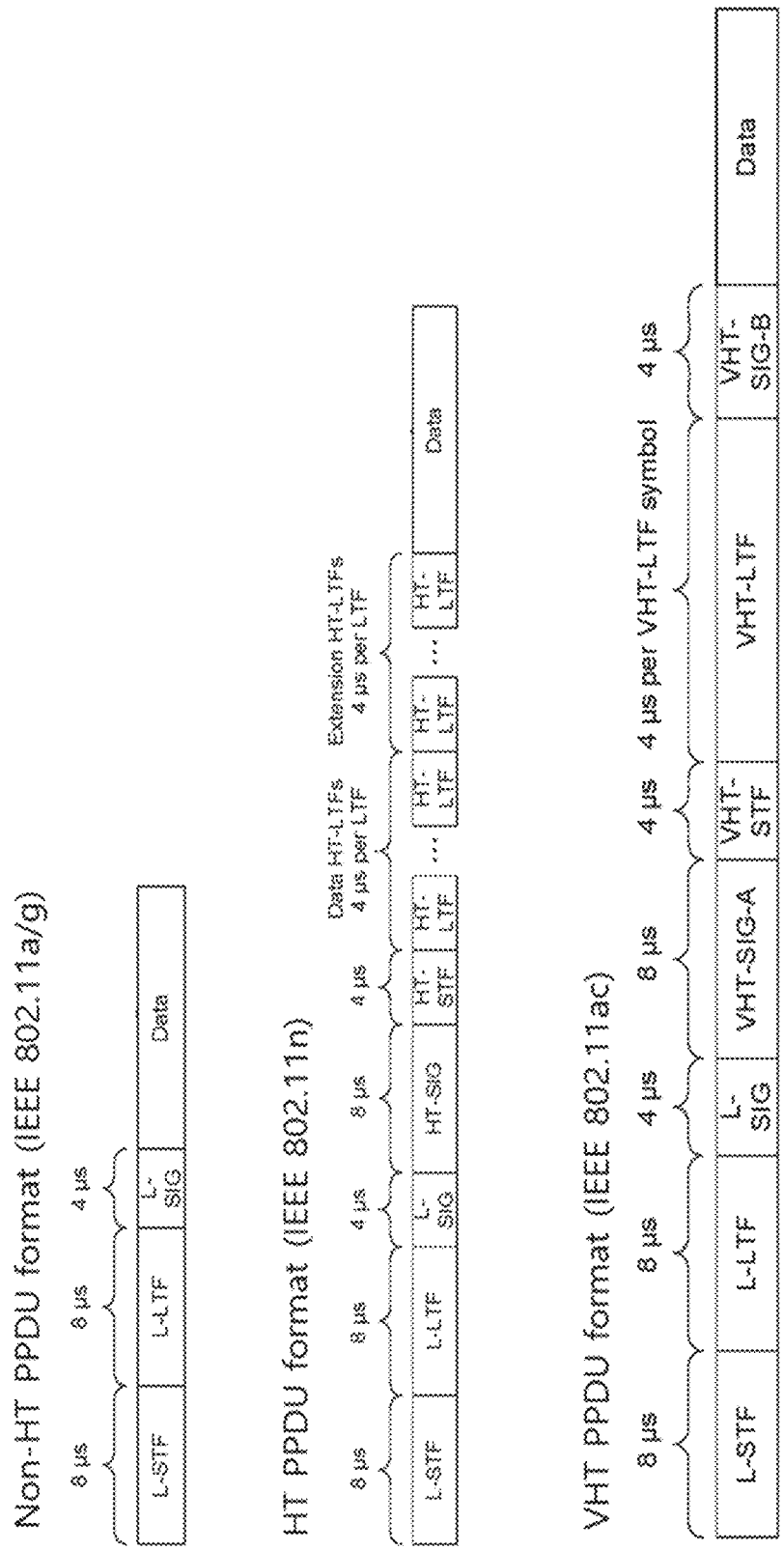
FIG. 1 shows PPDU formats used by the legacy system.

FIG. 1 shows PPDU formats used by the legacy system.

A non-HT PPDU supporting IEEE 802.11a/g includes a Legacy-Short Training Field (L-STF), a Legacy-Long Training Field (L-LTF), and a Legacy-Signal (L-SIG).

An HT PPDU supporting IEEE 802.11n includes a HT-SIG, a HT-STF, and a HT-LTF after the L-SIG.

A VHT PPDU supporting IEEE 802.11ac includes a VHT-SIG-A, a VHT-STF, a VHT-LTF, and a VHT-SIG-B after the L-SIG.

Figure 2:
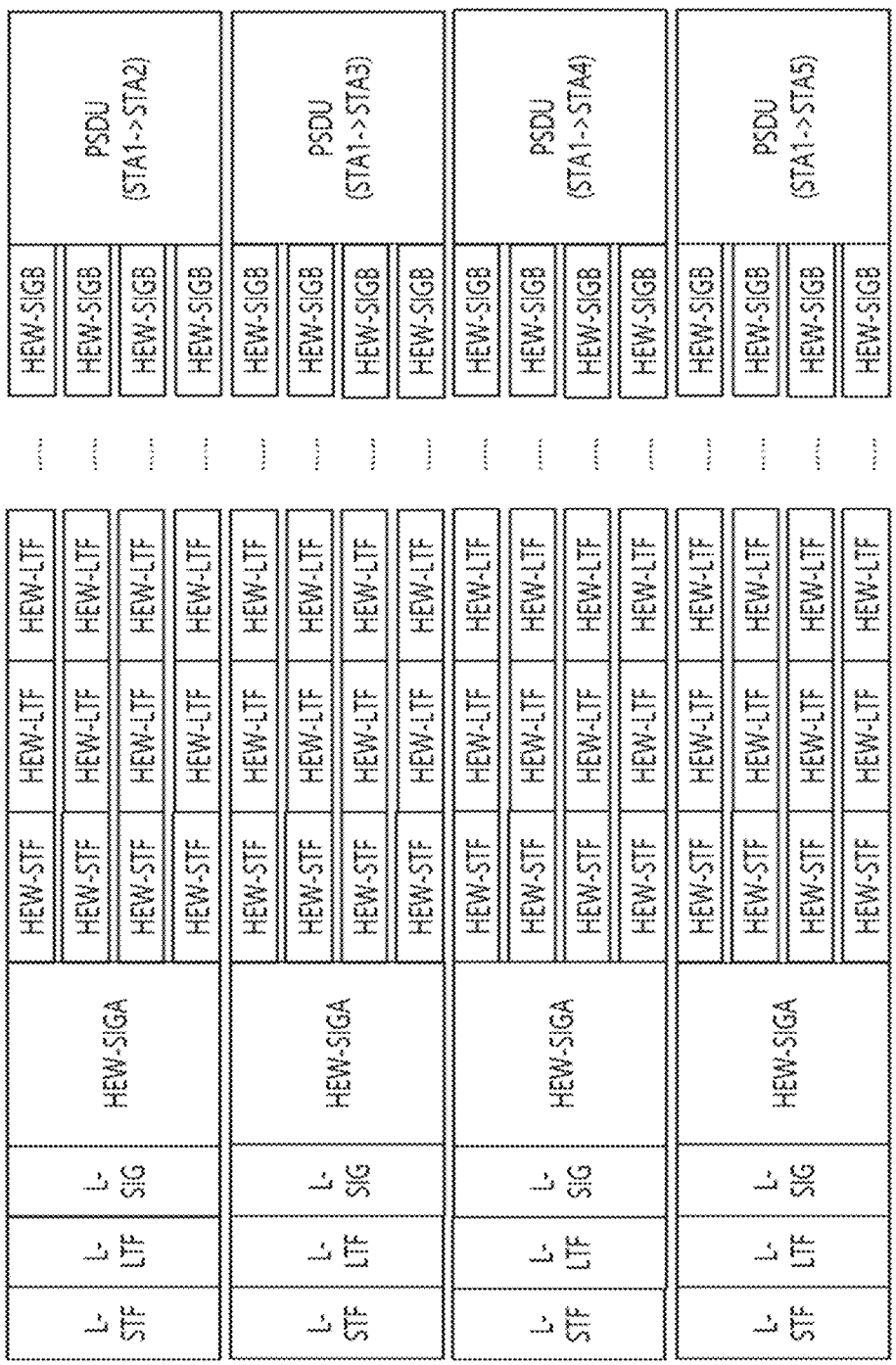
FIG. 2 shows an HEW PPDU format according to an embodiment of the present invention.

FIG. 2 shows an HEW PPDU format according to an embodiment of the present invention.

An L-STF may be used for frame detection, Automatic Gain Control (AGC), diversity detection, and coarse frequency/time synchronization.

An L-LTF may be used for fine frequency/time synchronization and channel estimation.

An L-SIG may include information indicating a total length of a corresponding PPDU (or information indicating a transmission time of a physical layer protocol service unit (PSDU)).

The L-STF, the L-LTF and the L-SIG may be identical to L-STF, L-LTF and L-SIG of the VHT system. The L-STF, the L-LTF and the L-SIG may be referred to as a legacy portion. The L-STF, the L-LTF, and the L-SIG may be transmitted in at least one Orthogonal Frequency Division Multiplexing (OFDM) symbol generated on the basis of 64-points Fast Fourier Transform (FFT) (or 64 subcarriers) in each 20 MHz channel. For 20 MHz transmission, the legacy portion may be generated by performing an inverse Discrete Fourier Transform (IDFT) with 64 FFT points. For 40 MHz transmission, the legacy portion may be generated by performing an IDFT with 128 FFT points. For 80 MHz transmission, the legacy portion may be generated by performing an IDFT with 512 FFT points.

A HEW-SIGA may include common control information commonly received by an STA which receives a PPDU. The HEW-SIGA may be transmitted in 2 OFDM symbols or 3 OFDM symbols.

The following table exemplifies information included in the HEW-SIGA. A field name or the number of bits is for exemplary purposes only.

TABLE 1

| Field | Bits | Description |
|---|---|---|
| Bandwidth | 2 | Set to 0 for 20 MHz, 1 for 40 MHz, 2 for 80 MHz, 3 for 160 MHz and 80 + 80 MHz mode |
| STBC | 1 | Set to 1 if all streams use STBC, otherwise set to 0. When STBC bit is 1, an odd number of space time streams per user is not allowed. |
| Group ID | 6 | Set to the value of the TXVECTOR parameter GROUP_ID. A value of 0 or 63 indicates a HEW SU PPDU; otherwise, indicates a HEW MU PPDU. |
| Nsts/Partial AID | 12 | For MU: 3 bits/user with maximum of 4 users<br>Set to 0 for 0 space time streams<br>Set to 1 for 1 space time stream<br>Set to 2 for 2 space time streams<br>Set to 3 for 3 space time streams<br>Set to 4 for 4 space time streams<br>Otherwise: first 3 bits contain stream allocation for SU, set to 0 for 1 space time stream, set to 1 for 2 space time streams, etcetera up to 8 streams. Remaining 9 bits contain partial |

TABLE 1-continued

| Field | Bits | Description |
|---|---|---|
| | | association identifier (AID). |
| No TXOP PS | 1 | Set to 1 to indicate that TXOP PS is not allowed. Set to 0 to indicate that TXOP PS is allowed. Set to the same value in all PPDUs in downlink MU TXOP. |
| GI (Guard interval) | 2 | Set B0 to 0 for Long GI, set to 1 for Short GI. Set B1 to 1 when Short GI. |
| Coding | 2 | For SU: Set B2 to 0 for BCC, set to 1 for LDPC For MU: Set B2 to 0 for BCC, set to 1 for LDPC for 1st user If user 1 has 0 Nsts value, then B2 is reserved and set to 1 |
| MCS | 4 | For SU/Broadcast/Multicast: Modulation and coding scheme (MCS) index For MU: B1: Set to 0 for BCC, 1 for LDPC for the 2nd user B2: Set to 0 for BCC, 1 for LDPC for the 3rd user B3: Set to 0 for BCC, 1 for LDPC for the 4th user If user 2, 3, or 4 has 0 Nsts value, then corresponding bit is reserved and set to 1 |
| SU-Beamformed | 1 | Set to 1 when packet is a SU-beamformed packet Set to 0 otherwise For MU: Reserved, set to 1 |
| CRC | 8 | |
| Tail | 6 | All zeros |

A HEW-STF may be used to improve an AGC estimation in an MIMO transmission.

A HEW-LTF may be used to estimate a MIMO channel. The HEW-LTF may start at the same point of time and may end at the same point of time across all users.

A HEW-SIGB may include user-specific information required for each STA to receive its PSDU. For example, the HEW-SIGB may include information regarding a length of a corresponding PSDU and/or a bandwidth or channel in which the PSDU for a corresponding receiver is transmitted.

A data portion may include at least one PSDU. The position of the HEW-SIGB is illustration purpose only. The HEW-SIGB may be followed by the data portion. The HEW-SIGB may be followed by the HEW-STF or the HEW-LTF.

In the proposed PPDU format, the number of OFDM subcarriers may be increased per unit frequency. The number of OFDM subcarriers may increase K-times by increasing FFT size. K may be 2, 4, or 8. This increase may be accomplished via downclocking (e.g., using a larger FFT size with a same sampling rate).

For example, K=4 downclocking is assumed. As for the legacy portion, 64 FFT is used in a 20 MHz channel, 128 FFT is used in a 40 MHz channel, and 256 FFT is used in an 80 MHz channel. As for a HEW portion using the larger FFT size, 256 FFT is used in a 20 MHz channel, 512 FFT is used in a 40 MHz channel, and 1024 FFT is used in an 80 MHz channel. The HEW-SIGA may have same FFT size as the legacy portion. The HEW portion may have larger FFT size than the legacy portion.

The PPDU is generated by performing IDFT with two different FFT sizes. The PPDU may include a first part with a first FFT size and a second part with a second FFT size. The first part may include at least one of the L-STF, the L-LTF, the L-SIG and the HEW-SIGA. The second part may include at least one of the HEW-STF, the HEW-LTF and the data portion. The HEW-SIGB may be included in the first part or in the second part.

When an FFT size is increased, an OFDM subcarrier spacing is decreased and thus the number of OFDM subcarriers per unit frequency is increased, but an OFDM symbol duration is increased. A guard interval (GI) (or also referred to as a Cyclic Prefix (CP) length) of the OFDM symbol time can be decreased when the FFT size is increased.

If the number of OFDM subcarriers per unit frequency is increased, a legacy STA supporting the conventional IEEE 80.2.11a/g/n/ac cannot decode a corresponding PPDU. In order for the legacy STA and an HEW STA to co-exist, L-STF, L-LTF, and L-SIG are transmitted through 64 FFT in a 20 MHz channel so that the legacy STA can receive the L-STF, the L-LTF, and the L-SIG. For example, the L-SIG is transmitted in a single OFDM symbol, a symbol time of the single OFDM symbol is 4 micro seconds (us), and the GI is 0.8 us.

Although the HEW-SIGA includes information required to decode an HEW PPDU by the HEW STA, the HEW-SIGA may be transmitted through 64 FFT in an 20 MHz channel so that it can be received by both of the legacy STA and the HEW STA. This is to allow the HEW STA to receive not only the HEW PPDU but also the conventional non-HT/HT/VHT PPDU.

Figure 3:
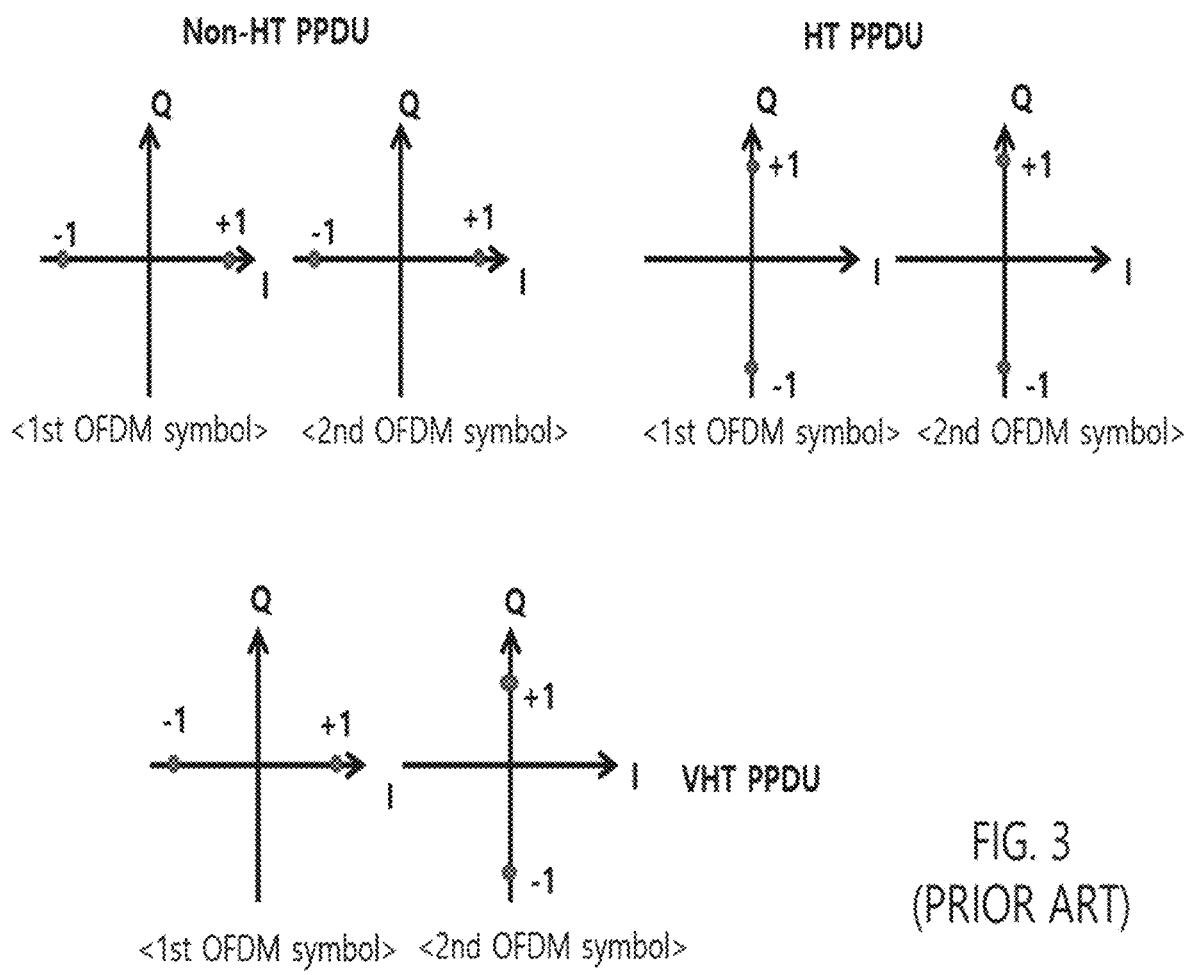
FIG. 3 shows constellation phases for the conventional PPDU.

FIG. 3 shows constellation phases for the conventional PPDU.

To identify a format of a PPDU, a phase of a constellation for two OFDM symbols transmitted after L-STF, L-LTF, and L-SIG is used.

A 'first OFDM symbol' is an OFDM symbol first appeared after the L-SIG. A 'second OFDM symbol' is an OFDM symbol subsequent to the first OFDM symbol.

In a non-HT PPDU, the same phase of the constellation is used in the 1st OFDM symbol and the 2nd OFDM symbol. Binary Phase Shift Keying (BPSK) is used in both of the 1st OFMD symbol and the 2nd OFDM symbol.

In an HT PPDU, although the same phase of the constellation is used in the 1st OFDM symbol and the 2nd OFDM symbol, the constellation rotates by 90 degrees in a counterclockwise direction with respect to the phase used in the non-HT PPDU. A modulation scheme having a constellation which rotates by 90 degrees is called Quadrature Binary Phase Shift Keying (QBPSK).

In a VHT PPDU, a constellation of the first OFDM symbol is identical to that of the non-HT PPDU, whereas a constellation of the second OFDM symbol is identical to that of the HT PPDU. The constellation of second OFDM symbol rotates 90 degrees in a counterclockwise direction with respect to the 1st OFDM symbol. The first OFDM symbol uses BPSK modulation, and the 2nd OFDM symbol uses QBPSK modulation. Since VHT-SIG-A is transmitted after L-SIG and the VHT-SIG-A is transmitted in two OFDM symbols, the first OFDM symbol and the second OFDM symbol are used to transmit the VHT-SIG-A.

Figure 4:
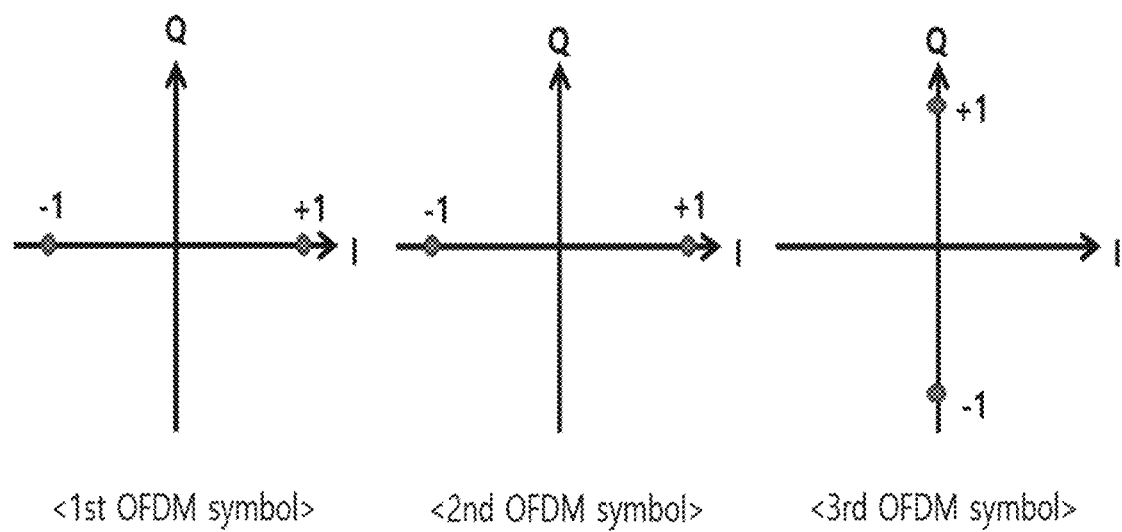
FIG. 4 shows constellation phases for a proposed HEW PPDU.

FIG. 4 shows constellation phases for a proposed HEW PPDU.

To distinguish from a non-HT/HT/VHT PPDU, a constellation of at least one OFDM symbol transmitted after L-SIG can be used.

Just like the non-HT PPDU, a first OFDM symbol and a second OFDM symbol of the HEW PPDU have the same constellation phase. A BPSK modulation may be used for the first OFDM symbol and the second OFDM symbol. The STA can differentiate the HEW PPDU and HT/VHT PPDUs.

In an embodiment, to differentiate the HEW PPDU and the non-HT PPDU, the constellation of a third OFDM symbol can be utilized. The constellation of the third OFDM symbol may rotate by 90 degrees in a counterclockwise direction with respect to the second OFDM symbol. The first and second OFDM symbols may use BPSK modulation, but the third OFDM symbol may use QBPSK modulation.

In another embodiment, the HEW-SIGA may provide an indication about the format of the PPDU. The indication may indicate whether the format of the PPDU is a HEW PPDU. The HEW-SIGA may provide an indication about a use of orthogonal frequency division multiple access (OFDMA).

Hereinafter, a PPDU using a phase rotation in frequency domain is proposed in order to support lower Peak-to-Average Power Ratio (PAPR).

For clarity, it is assumed that the second part (i.e. HEW part) of the PPDU uses 4-times FFT size via downclocking.

Hereinafter, a subchannel refers to a resource allocation unit to be allocated to a STA. Operating bandwidth (i.e. 20 MHz channel, 40 MHz channel, 80 MHz channel or 160 MHz channel) can be divided into a plurality of subchannels. A subchannel may include one or more subcarriers. The plurality of subchannels may have same number of subcarriers or different number of subcarriers. One or more subchannels can be allocated to the STA. The STA can transmit one or more PPDUs through the allocated subchannels. The subchannel may be referred to as 'a subband' or 'a subgroup'.

Figure 5:
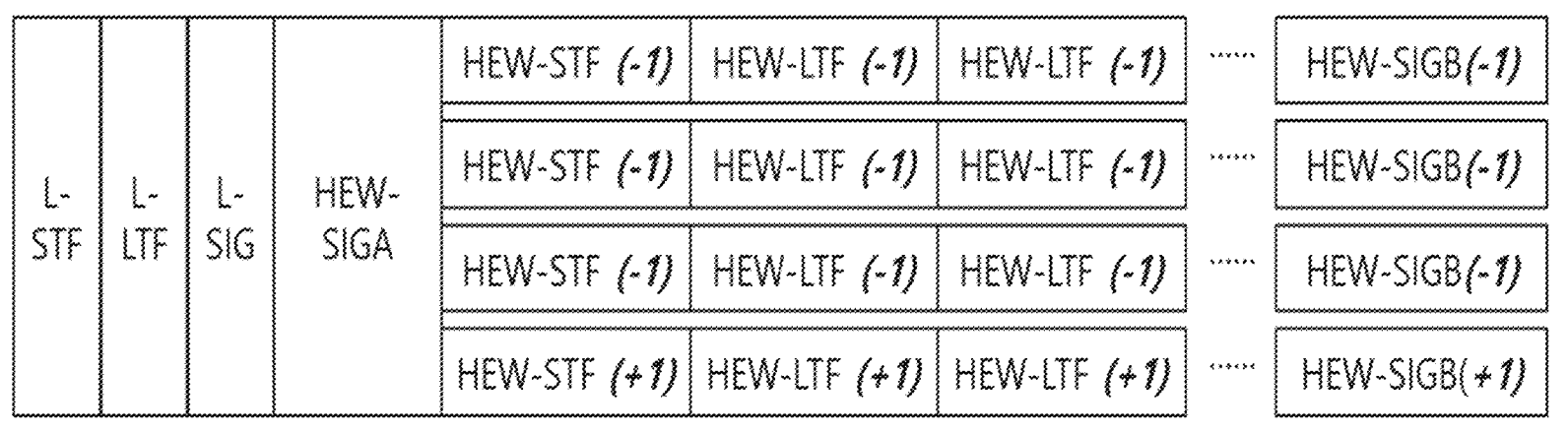

FIG. 5 shows an HEW PPDU format using 256 FFT in a 20 MHz channel.

The first part (i.e. L-LTF, L-LTF, L-SIG and HEW-SIGA) uses 64 FFT in the 20 MHz channel. In order to implement the 256 FFT in the second part, it is proposed to decrease an overhead by performing ¼ down-clocking on a VHT 80 MHz PPDU format and by decreasing GI to 0.8 us and 0.4 us.

If the VHT 80 MHz PPDU format is subjected to ¼ down-clocking, an OFDM symbol time is increased by four times, and thus is 16 us when using Long GI, and is 14.4 us when using Short GI. That is, the GI is also increased to 3.2 us in case of Long GI and to 1.6 us in case of Short GI. However, the GI may keep to 0.8 us in case of Long GI and to 0.4 us in case of Short GI. In doing so, after performing the ¼ downclocking, the OFDM symbol time is 13.6 us when using Long GI and is 13.2 us when using Short GI.

If the VHT 80 MHz PPDU format is subjected to ¼ down-clocking in the 20 MHz channel, each of 64 FFT-based VHT-STF, VHT-LTF, and VHT-SIG-B may constitute one subchannel, and as a result, 4 subchannels are combined and transmitted through the 20 MHz channel in unit of 256 FFT.

In FIG. 5, in order to decrease a Peak-to-Average Power Ratio (PAPR) of a transmitter STA, the second part may be subjected to multiplication for a phase waveform in unit of subchannel as follows.

$$R(k) = \begin{cases} -1, & k \geq -64 \\ +1, & k < -64 \end{cases} \quad \text{[Equation 1]}$$

Herein, R(k) denotes a multiplication value for a phase waveform at a subcarrier index k. 256 subcarriers are divided into 4 subchannels. Respective subchannel is composed of 64 subcarriers. A sequence {+1, −1, −1, −1} may be multiplied for the 4 subchannels, starting from a subchannel having a smallest subcarrier index, that is, a lowermost subchannel.

The equation 1 can be expressed as follows. The 256 subcarriers are divided into first and second subgroups that have different number of subcarriers. The first subgroup is phase-rotated by multiplying +1 and the second subgroup is phase-rotated by multiplying −1.

A sequence constituting the HEW-STF and the HEW-LTF may be as follows.

HEW-STF={HTS$_{-58,58}$, 0, 0, 0, 0, 0, 0, 0, 0, 0, 0, 0, HTS$_{-58,58}$},

HEW-LTF={LTFleft, 1, LTFright, −1, −1, −1, 1, 1, −1, 1, −1, 1, 1, −1, LTFleft, 1, LTFright, 1, −1, 1, −1, 0, 0, 0, 1, −1, −1, 1, LTFleft, 1, LTFright, −1, −1, −1, 1, 1, −1, 1, −1, 1, 1, −1, LTFleft, 1, LTFright} where:

HTS$_{-58,58}$=$\sqrt{1/2}$ {0, 1, 1+j, 0, 0, 0, −1−j, 0, 0, 0, 1+j, 0, 0, 0, −1−j, 0, 0, 0, −1−j, 0, 0, 0, 1+j, 0, 0, 0, 0, 0, 0, −1−j, 0, 0, 0, −1−j, 0, 0, 0, 1+j, 0, 0, 0, 1+j, 0, 0, 0, 1+j, 0, 0, 0, 1+j, 0, 0, 0, 0, 0, 0, 0, 0, 0, 0, 0, 0, 0, 0, 1+j, 0, 0, 0, −1−j, 0, 0, 0, 1+j, 0, 0, 0, −1−j, 0, 0, 0, −1−j, 0, 0, 0, 1+j, 0, 0, 0, 0, 0, 0, −1−j, 0, 0, 0, −1−j, 0, 0, 0, 1+j, 0, 0, 0, 1+j, 0, 0, 0, 1+j, 0, 0}, LTFleft={1, 1, −1, −1, 1, 1, −1, 1, −1, 1, 1, 1, 1, 1, 1, −1, −1, 1, 1, −1, 1, −1, 1, 1, 1, 1}, LTFright={1, −1, −1, 1, 1, −1, 1, −1, 1, −1, −1, −1, −1, −1, 1, 1, −1, −1, 1, −1, 1, −1, 1, 1, 1, 1}.

FIG. 6 shows an HEW PPDU format in a 40 MHz channel.

In order to implement the 512 FFT in the 40 MHz channel, it is proposed to use two blocks for the aforementioned 256 FFT transmission of the 20 MHz channel. Like in the 256 FFT transmission in the 20 MHz channel, an OFDM symbol time is 13.6 us when using Long GI, and is 13.2 us when using Short GI.

L-STF, L-LTF, L-SIG, and HEW-SIGA are generated using 64 FFT and are transmitted in a duplicated manner two times in the 40 MHz channel. That is, the first part is transmitted in a first 20 MHz subchannel and its duplication is transmitted in a second 20 MHz subchannel.

In order to decrease a PAPR of a transmitter STA for transmitting the L-STF, the L-LTF, the L-SIG, and the HEW-SIGA, multiplication may be performed on a phase waveform in unit of 20 MHz channel as follows.

$$R(k) = \begin{cases} +j, & k \geq 0 \\ +1, & k < 0 \end{cases} \quad \text{[Equation 2]}$$

This means that the first part is phase-rotated by multiplying +1 for the first 20 MHz subchannel and is phase-rotated by multiplying +j for the second 20 MHz subchannel.

The equation 2 can be expressed as follows. The 128 subcarriers are divided into first and second subgroups. The first subgroup is phase-rotated by multiplying +1 and the second subgroup is phase-rotated by multiplying +j.

For each 64 FFT-based subchannel constituting 512 FFT, in order to decrease a PAPR of a transmitter STA for transmitting HEW-STF, HEW-LTF, and HEW-SIGB, multiplication may be performed on a phase waveform in unit of subchannel as follows.

$$R(k) = \begin{cases} -1, & 64 \le k \\ +1, & 0 \le k < 64 \\ -1, & -192 \le k < 0 \\ +1, & k < -192 \end{cases} \quad \text{[Equation 3]}$$

More specifically, according to Equation 3, 512 subcarriers are divided into 8 subchannels. Respective subchannel is composed of 64 subcarriers. A sequence $\{+1, -1, -1, -1, +1, -1, -1, -1\}$ may be multiplied for the 8 subchannels, starting from a subchannel having a smallest subcarrier index, that is, a lowermost subchannel.

The equation 3 can be expressed as follows. The 512 subcarriers are divided into four subgroups. The first subgroup is phase-rotated by multiplying +1, the second subgroup is phase-rotated by multiplying −1, the third subgroup is phase-rotated by multiplying +1, and the fourth subgroup is phase-rotated by multiplying −1.

A sequence constituting the HEW-STF and the HEW-LTF may be as follows.

HEW-STF={HTS$_{-58,58}$, 0, 0, 0, 0, 0, 0, 0, 0, 0, 0, 0, HTS$_{-58,58}$, 0, 0, 0, 0, 0, 0, 0, 0, 0, 0, 0, HTS$_{-58,58}$, 0, 0, 0, 0, 0, 0, 0, 0, 0, 0, 0, HTS$_{-58,58}$},

HEW-LTF={LTFleft, 1, LTFright, −1, −1, −1, 1, 1, −1, 1, −1, 1, 1, −1, LTFleft, 1, LTFright, 1, −1, 1, −1, 0, 0, 0, 1, −1, −1, 1, LTFleft, 1, LTFright, −1, −1, −1, 1, 1, −1, 1, −1, 1, 1, −1, LTFleft, 1, LTFright, 0, 0, 0, 0, 0, 0, 0, 0, 0, 0, LTFleft, 1, LTFright, −1, −1, −1, 1, 1, −1, 1, −1, 1, 1, −1, LTFleft, 1, LTFright, 1, −1, 1, −1, 0, 0, 0, 1, −1, −1, 1, LTFleft, 1, LTFright, −1, −1, −1, 1, 1, −1, 1, 1, −1, LTFleft, 1, LTFright}

Herein,

HTS$_{-58,58}$=$\sqrt{1/2}$ {0, 1, 1+j, 0, 0, 0, −1−j, 0, 0, 0, 1+j, 0, 0, 0, −1−j, 0, 0, 0, −1−j, 0, 0, 0, 1+j, 0, 0, 0, 0, 0, 0, 0, −1−j, 0, 0, 0, −1−j, 0, 0, 0, 1+j, 0, 0, 0, 1+j, 0, 0, 0, 1+j, 0, 0, 0, 1+j, 0, 0, 0, 0, 0, 0, 0, 0, 0, 0, 0, 0, 0, 1+j, 0, 0, 0, −1−j, 0, 0, 0, 1+j, 0, 0, 0, −1−j, 0, 0, 0, −1−j, 0, 0, 0, 1+j, 0, 0, 0, 0, 0, 0, 0, −1−j, 0, 0, 0, −1−j, 0, 0, 0, 1+j, 0, 0, 0, 1+j, 0, 0, 0, 1+j, 0, 0, 0, 1+j, 0, 0}, LTFleft={1, 1, −1, −1, 1, 1, −1, 1, −1, 1, 1, 1, 1, 1, 1, −1, −1, 1, 1, −1, 1, −1, 1, 1, 1, 1}, LTFright={1, −1, −1, 1, 1, −1, 1, −1, 1, −1, −1, −1, −1, −1, 1, 1, −1, −1, 1, −1, 1, −1, 1, 1, 1, 1}.

FIG. 7 shows an HEW PPDU format in an 80 MHz channel.

In order to implement the 1024 FFT in the 80 MHz channel, it is proposed to use four blocks for the aforementioned 256 FFT transmission of the 20 MHz channel. Like in the 256 FFT transmission in the 20 MHz channel, an OFDM symbol time is 13.6 us when using Long GI, and is 13.2 us when using Short GI.

L-STF, L-LTF, L-SIG, and HEW-SIGA which are transmitted using 64 FFT are also transmitted in a duplicated manner four times in the 80 MHz channel. That is, the first part is transmitted in a first 20 MHz subchannel and its duplications are transmitted in second, third and fourth 20 MHz subchannels respectively.

In order to decrease a PAPR of a transmitter STA for transmitting the L-STF, the L-LTF, the L-SIG, and the HEW-SIGA, multiplication may be performed on a phase waveform in unit of 20 MHz channel as follows.

$$R(k) = \begin{cases} -1, & k \ge -64 \\ +1, & k < -64 \end{cases} \quad \text{[Equation 4]}$$

This means that the first part is phase-rotated by multiplying +1 for the first 20 MHz subchannel and is phase-rotated by multiplying −1 for the second, third and fourth 20 MHz subchannels.

The equation 4 can be expressed as follows. The 256 subcarriers are divided into first and second subgroups that have different number of subcarriers. The first subgroup is phase-rotated by multiplying +1 and the second subgroup is phase-rotated by multiplying −1.

For each 64 FFT-based subchannel constituting 1024 FFT, in order to decrease a PAPR of a transmitter STA for transmitting HEW-STF, HEW-LTF, and HEW-SIGB, multiplication may be performed on a phase waveform in unit of subchannel as follows.

$$R(k) = \begin{cases} -1, & 256 \le k \\ +1, & 192 \le k < 256 \\ -1, & 64 \le k < 192 \\ +1, & 0 \le k 64 \\ -1, & -192 \le k < 0 \\ +1, & 256 \le k \le -192 \\ -1, & -448 \le k < -256 \\ +1, & k < -448 \end{cases} \quad \text{[Equation 5]}$$

More specifically, according to Equation 5, 1024 subcarriers are divided into 16 subchannels. Respective subchannel is composed of 64 subcarriers. A sequence $\{+1, -1, -1, -1, +1, -1, -1, -1, +1, -1, -1, -1, +1, -1, -1, -1\}$ may be multiplied for the 16 subchannels, starting from a subchannel having a smallest subcarrier index, that is, a lowermost subchannel.

The equation 5 can be expressed as follows. The 1024 subcarriers are divided into 8 subgroups. The first subgroup is phase-rotated by multiplying +1, the second subgroup is phase-rotated by multiplying −1, the third subgroup is phase-rotated by multiplying +1, the fourth subgroup is phase-rotated by multiplying −1, the fifth subgroup is phase-rotated by multiplying +1, the sixth subgroup is phase-rotated by multiplying −1, the seventh subgroup is phase-rotated by multiplying +1 and the eighth subgroup is phase-rotated by multiplying −1.

A sequence constituting the HEW-STF and the HEW-LTF is as follows.

HEW-STF={HTS$_{-58,58}$, 0, 0, 0, 0, 0, 0, 0, 0, 0, 0, 0, HTS$_{-58,58}$, 0, 0, 0, 0, 0, 0, 0, 0, 0, 0, 0, HTS$_{-58,58}$, 0, 0, 0, 0, 0, 0, 0, 0, 0, 0, 0, HTS$_{-58,58}$, 0, 0, 0, 0, 0, 0, 0, 0, 0, 0, 0, HTS$_{-58,58}$, 0, 0, 0, 0, 0, 0, 0, 0, 0, 0, 0, HTS$_{-58,58}$, 0, 0, 0, 0, 0, 0, 0, 0, 0, 0, 0, HTS$_{-58,58}$, 0, 0, 0, 0, 0, 0, 0, 0, 0, HTS$_{-58,58}$},

HEW-LTF={LTFleft, 1, LTFright, −1, −1, −1, 1, 1, −1, 1, −1, 1, 1, −1, LTFleft, 1, LTFright, 1, −1, 1, −1, 0, 0, 0, 1, −1, −1, 1, LTFleft, 1, LTFright, −1, −1, −1, 1, 1, −1, 1, −1, 1, 1, −1, LTFleft, 1, LTFright, 0, 0, 0, 0, 0, 0, 0, 0, 0, 0, 0, LTFleft, 1, LTFright, −1, −1, −1, 1, 1, −1, 1, −1, 1, 1, −1, LTFleft, 1, LTFright, 1, −1, 1, −1, 0, 0, 0, 1, −1, −1, 1, LTFleft, 1, LTFright, −1, −1, −1, 1, 1, −1, 1, −1, 1, 1, −1, LTFleft, 1, LTFright, 0, 0, 0, 0, 0, 0, 0, 0, 0, 0, 0, LTFleft, 1, LTFright, −1, −1, −1, 1, 1, −1, 1, −1, 1, 1, −1, LTFleft, 1, LTFright, 1, −1, 0, 0, 0, 1, −1, −1, 1, LTFleft, 1, LTFright, −1, −1, −1, 1, 1, −1, 1, −1, 1, 1, −1, LTFleft, 1, LTFright, 0, 0, 0, 0, 0, 0, 0, 0, 0, 0, 0, LTFleft, 1, LTFright, −1, −1, −1, 1, 1, −1, 1, −1, 1, 1, −1, LTFleft, 1, LTFright, 1, −1, 1, −1, 0, 0, 0, 1, −1, −1, 1, LTFleft, 1, LTFright, −1, −1, −1, 1, 1, −1, 1, −1, 1, 1, −1, LTFleft, 1, LTFright}, Herein, $HTS_{-58,58} = \sqrt{1/2}$ {0, 1, 1+j, 0, 0, 0, −1−j, 0, 0, 0, 1+j, 0, 0, 0, −1−j, 0, 0, 0, −1−j, 0, 0, 0, 1+j, 0, 0, 0, 0, 0, 0, 0, −1−j, 0, 0, 0, −1−j, 0, 0, 0, 1+j, 0, 0, 0, 1+j, 0, 0, 0, 1+j, 0, 0, 0, 1+j, 0, 0, 0, 0, 0, 0, 0, 0, 0, 0, 0, 0, 0, 0, 0, 1+j, 0, 0, 0, −1−j, 0, 0, 0, 1+j, 0, 0, 0, −1−j, 0, 0, 0, −1−j, 0, 0, 0, 1+j, 0, 0, 0, 0, 0, 0, −1−j, 0, 0, 0, −1−j, 0, 0, 0, 1+j, 0, 0, 0, 1+j, 0, 0, 0, 1+j, 0, 0, 0, 0}, LTFleft={1, 1, −1, −1, 1, 1, −1, 1, −1, 1, 1, 1, 1, 1, 1, −1, −1, 1, 1, −1, 1, −1, 1, 1, 1, 1}, LTFright={1, −1, −1, 1, 1, −1, 1, −1, 1, −1, −1, −1, −1, −1, 1, 1, −1, −1, 1, −1, 1, −1, 1, 1, 1, 1}

An FFT size can be increased to improve PPDU transmission efficiency. In order to provide compatibility with the legacy STA, the first part (STF, LTF, L-SIG and HEW-SIGA) using the same FFT size as the legacy PPDU is first transmitted, and subsequently the second part (HEW-STF, HEW-LTF, HEW-SIGB and a PSDU) using a larger FFT size are transmitted.

In order to decrease a PAPR of a transmitter STA, the first part and the second part uses different phase rotation in frequency domain. It means that a phase rotation for subcarriers in the first part is different from a phase rotation for subcarriers in the second part.

Figure 8:
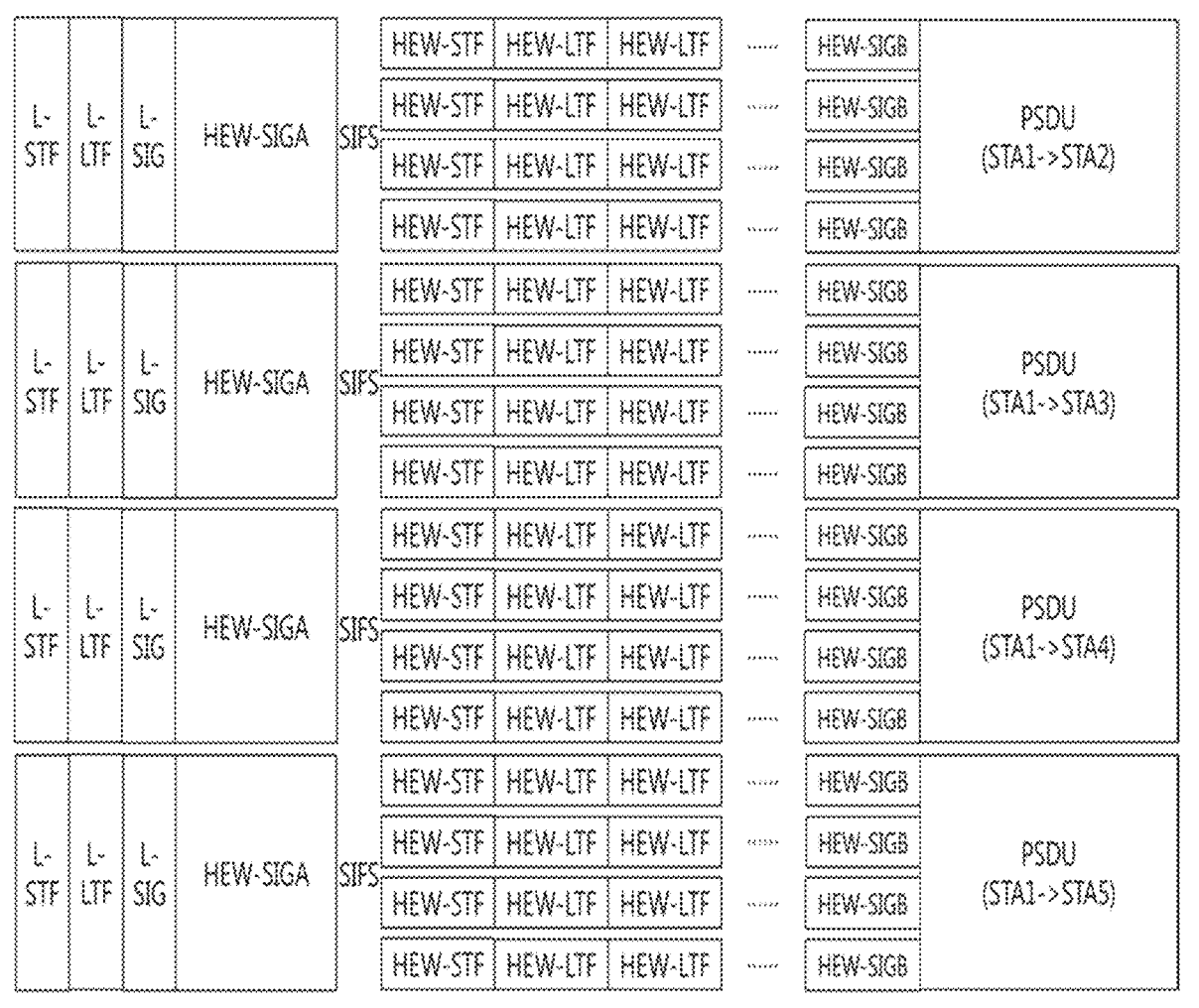

FIG. 8 shows a PPDU format according to another embodiment of the present invention.

Since the number of OFDM subcarriers per unit frequency increases after transmitting L-STF, L-LTF, L-SIG, and HEW-SIGA, a processing time may be required to process data with larger FFT size. The processing time may be called an HEW transition gap.

In an embodiment, the HEW transition gap may be implemented by defining a Short Inter-Frame Space (SIFS) followed by the HEW-STF. The SIFS may be positioned between the HEW-SIGA and the HEW-STF. The SIFS may be positioned between the HEW-SIGB and the HEW-STF.

In another embodiment, the HEW transition gap may be implemented in such a manner that the HEW-STF is transmitted one more time. The duration of the HEW-STF may vary depending on the processing time or STA's capability. If the processing time is required, the duration of the HEW-STF may become double.

Hereinafter, a proposed bandwidth signaling is described.

A transmitter STA may transmit a Request To Send (RTS) frame to a destination STA before transmitting an HEW PPDU. Further, the transmitter STA may receive a Clear To Send (CTS) frame from the destination STA as a response. A transmission bandwidth of the HEW PPDU may be determined using a bandwidth signal through RTS/CTS exchange between the transmitter STA and the destination STA.

If the transmitter STA performs Clear Channel Assessment (CCA) and if it is determined that a 40 MHz channel is idle, the RTS frame is transmitted through the 40 MHz channel. The destination STA receives the RTS frame only in the 20 MHz channel if only the 20 MHz channel is idle, and the destination STA responds with the CTS frame to the transmitter STA in the 20 MHz channel. Since the transmitter STA transmits the RTS frame through the 40 MHz channel but receives the CTS frame as a response only in the 20 MHz channel, a transmission bandwidth of an HEW PPDU may be less than or equal to a channel bandwidth in which a response is received using the CTS frame.

Figure 9:
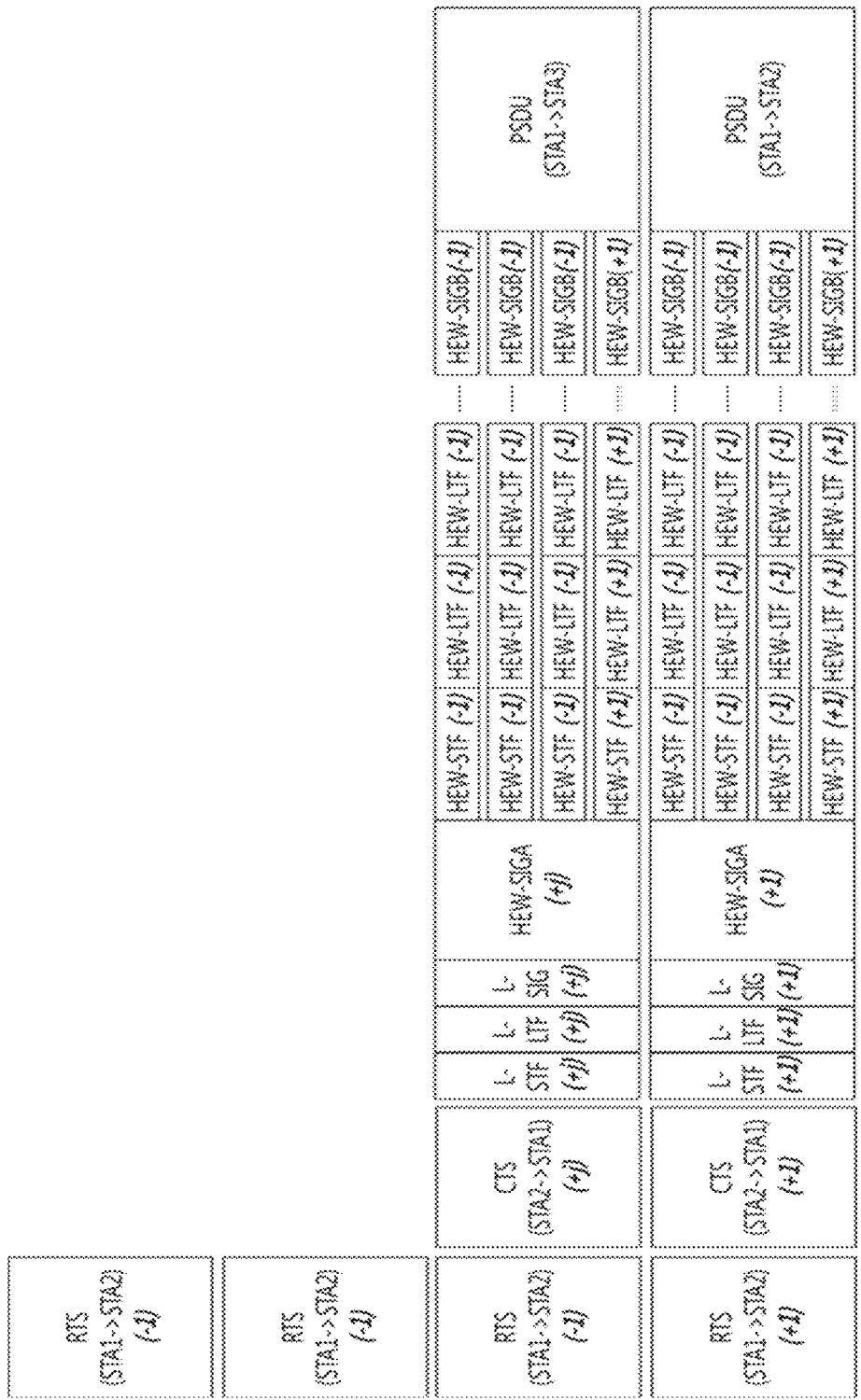
FIG. 9 shows bandwidth signaling according to an embodiment of the present invention.

FIG. 9 shows bandwidth signaling according to an embodiment of the present invention. An STA1 is a transmitter STA, and an STA2 is a destination STA.

Before transmitting an HEW PPDU, the STA1 transmits an RTS frame to the STA2, and receives a CTS frame from the STA2. The STA1 performs CCA, and since it is determined that an 80 MHz channel is idle, transmits the RTS frame through the 80 MHz channel in unit of 20 MHz channel in a duplicated manner. That is, four 20 MHz RTS frames (i.e., one 20 MHz RTS frame and three duplicated RTS frames) are transmitted at an 80 MHz band. For the purpose of decreasing a PAPR of an STA for transmitting the RTS frame, a value of {1, −1, −1, −1} may be multiplied each 20 MHz channel.

In the STA2, only a 40 MHz channel is idle and thus the RTS frame is received only through the 40 MHz channel. The STA2 responds with the CTS frame to the STA1 in the 40 MHz channel.

Although the STA1 transmits the RTS frame through the 80 MHz channel, the CTS frame is received only through the 40 MHz channel. Therefore, a transmission bandwidth of an HEW PPDU transmitted at a later time may be set to a 40 MHz channel bandwidth at which a response is received using the CTS frame.

The CTS frame may also be transmitted in a duplicated manner in unit of 20 MHz. For the purpose of decreasing a PAPR of the STA2 for transmitting a plurality of CTS frames, a value of {1, j} may be multiplied each 20 MHz channel.

The HEW PPDU can be transmitted simultaneously to a plurality of destination STAs by a transmitter STA by independently dividing a channel. In FIG. 9, as to a PSDU transmitted by the STA1, one PSDU is transmitted to the STA2 by using the lowermost 20 MHz channel, and at the same time, another PSDU is transmitted to an STA3 by using a 20 MHz channel thereon. However, optionally, it is also possible that the transmitter STA, i.e., STA1, performs transmission to only one destination STA without having to independently divide all available channels.

When the HEW PPDU is simultaneously transmitted to a plurality of destination STAs by independently dividing a channel, a channel bandwidth of each PSDU addressed to each destination STA may be limited to be less than or equal to a channel bandwidth in which a response is received using the CTS frame. Also, a sum of channel bandwidths of all PSDUs in the HEW PPDU may be limited to be less than or equal to a channel bandwidth in which a response is received using the CTS frame. After exchanging RTS/CTS frame, the HEW PPDU being simultaneously transmitted to a plurality of destination STAs may have a PSDU addressed to a STA responding a CTS frame. In FIG. 9, because the STA2 responds with the CTS frame, the PSDU addressed to the STA2 is included in the HEW PPDU.

A phase rotation sequence of a HEW PPDU may be determined based on a transmission bandwidth of the HEW PPDU. A phase rotation sequence of a HEW PPDU transmitted to either a single destination STA or transmitted to a plurality of destination STAs is same when the transmission bandwidth of the HEW PPDU is identical. In FIG. 9, an HEW PPDU using 512 FFT in a 40 MHz channel is applying the same phase rotation sequence as described in FIG. 6 although the PSDUs of HEW PPDU are addressed to a plurality of destination STAs.

Now, a method related to a PPDU transmission and an error recovery during a transmission opportunity (TXOP) is described.

A TXOP may be defined as an interval of time during which a STA has the right to initiate frame exchange sequences onto a wireless medium. An access category (AC) may be defined as a label for the common set of enhanced distributed channel access (EDCA) parameters that are used by a station to contend for the channel in order to transmit medium access control (MAC) service data units (MSDUs) with certain priorities. The AC relates to quality-of-service (QoS) requirements.

If a STA transmits one or more PPDUs simultaneously to a plurality of destination STAs by independently transmitting the PPDUs on each channel, this may be called as an OFDMA mode. While operating in the OFDMA mode, the STA can send one or more PPDUs to the plurality of destination STAs via plurality of channels as shown in FIGS. 8 and 9.

A subchannel may refer to a transmission unit allocated to each destination STA in the OFDMA mode. An operating bandwidth can be divided into a plurality of subchannels. If a transmitter STA transmits an each HEW PPDU simultaneously to a plurality of destination STAs by independently transmitting the HEW PPDU on each channel, the each HEW PPDU to be transmitted to a specific destination STA has the same Access Category. In FIG. 9, a PPDU transmitted from an STA1 to an STA2 and a PPDU transmitted by the STA1 to an STA3 must have the same Access Category. A TXOP Limit is set differently depending on an Access Category of the TXOP. Therefore, this implies that the same TXOP Limit value must be applied to all PPDUs to be transmitted, if the transmitter STA transmits the HEW PPDU simultaneously to the plurality of destination STAs by transmitting the HEW PPDU on each channel. For this, a Primary Access Category is proposed.

The Primary Access Category may indicate an Access Category of a Back-off timer used by an STA2 to acquire a TXOP. In FIG. 9, a Back-off timer is running for each Access Category before an STA1 transmits an RTS frame, and if a Back-off timer corresponding to Access Category Voice (AC_VO) reaches 0 among the Back-off timers, the AC_VO corresponds to the Primary Access Category. If the Primary Access Category is determined, the HEW PPDU with the Primary Access Category can only be transmitted.

Since each of the plurality of destination STAs has a different amount of data to be received, HEW PPDUs of different Access Categories can be simultaneously transmitted by independently dividing it for each channel according to another embodiment of the present invention. However, in this case, a TXOP Limit of the corresponding TXOP must be determined by the Primary Access Category. In FIG. 9, when the Primary Access Category is the AC_VO, an Access Category of a PPDU transmitted by the STA1 to the STA2 must be the AC_VO, and the entire TXOP is restricted by the TXOP Limit of the AC_VO. An Access Category of a PPDU transmitted by the STA1 to the STA3 may be AC_VI (Video), AC_BE (Best Effort) or AC_BK (Background).

If an available bandwidth of a destination STA is wider than a transmission bandwidth of a transmitter STA which acquires a TXOP, the destination STA may support simultaneous transmission performed by another STA by independently dividing it for each channel, in addition to the transmitter STA.

The transmitter STA which has acquired the TXOP through the Back-off mechanism transmits an RTS frame to the destination STA. The bandwidth signal and Access Category may be included in the RTS frame. On the basis of the bandwidth and Access Category included in the RTS frame, the destination STA may allow another STA to transmit a data frame for the destination STA. During the TXOP of the transmitter STA, a channel not used by the transmitter STA is allowed to be used by another STA. A destination STA can transmits at least one CTS frames via at least one idle subchannel. For example, the destination STA may send a first CTS frame via a first subchannel to the transmitter STA and may send a second CTS frame via a second subchannel to another STA. The transmitter STA which has received the first CTS frame can transmit a data frame to the destination STA by utilizing only the first subchannel which receives the first CTS frame. The destination STA can also utilize the second subchannel to communicate with another STA.

FIG. 10 shows an example of PPDU transmission having an RTS/CTS bandwidth signal.

Before transmitting an HEW PPDU, a transmitter STA, i.e., an STA2, transmits an RTS frame to one destination STA, i.e., an STA1, and receives a CTS frame as a response from the STA1. The STA2 performs Clear Channel Assessment (CCA). The STA2 determines that an 80 MHz channel is idle, transmits the RTS frame through the 80 MHz channel in unit of 20 MHz channel in a duplicated manner. In order to decrease a PAPR, a phase rotation sequence of {+1, −1, −1, −1} is multiplied over four 20 MHz channels.

In a case where the destination STA, i.e., the STA1, intends to support simultaneous transmission of an HEW PPDU by a plurality of transmitter STAs by independently dividing it for each channel, a CTS frame may be transmitted to different transmitter STAs for each channel as a response. In FIG. 10, it can be seen that the STA1 responds with the CTS frame to the STA2, and at the same time, STA1 sends with a CTS frame to an STA3 in a different channel. Although the CTS frame is simultaneously transmitted by being independently divided for each channel with respect to different transmitter STAs, it can be seen that transmission is performed by multiplying four 20 MHz channels by a phase rotation sequence of {+1, −1, −1, −1}.

The STA2 and STA3 can receive the CTS frames from the STA1 respectively. Respective CTS frame has information about its transmission channel and an Access Category. STA2 and STA3 can send HEW PPDUs to the STA1 via transmission channels in which corresponding CTS frames are received.

The HEW PPDUs may have same Access Category. In FIG. 10, a HEW PPDU1 transmitted by the STA2 to the STA1 and a HEW PPDU2 transmitted by the STA3 to the STA1 may have the same Access Category. A TXOP Limit is set differently depending on an Access Category of the TXOP. Therefore, same TXOP Limit can be applied to all HEW PPDUs to be transmitted. For this, the aforementioned Primary Access Category may be defined.

The Primary Access Category indicates an Access Category of a Back-off timer used by a STA to acquire the TXOP. In FIG. 10, a Back-off timer is running for each Access Category before an STA1 transmits an RTS frame. If a Back-off timer corresponding to Access Category Voice (AC_VO) reaches 0, the AC_VO corresponds to the Primary Access Category. If the Primary Access Category is determined, information about the Primary Access Category can be sent to a destination STA. The destination STA can deliver the Primary Access Category information to the plurality of transmitter STAs. Accordingly, all PPDUs to be transmitted by the plurality of transmitter STAs can have same Access Category.

Since the plurality of transmitter STAs have a different amount of data to transmit, HEW PPDUs of different Access Categories can be simultaneously transmitted by independently dividing it for each channel according to another embodiment of the present invention. However, in this case, a TXOP Limit of the corresponding TXOP must be determined by the Primary Access Category. In FIG. 10, when the Primary Access Category is the AC_VO, an Access Category of a PPDU transmitted by the STA1 to the STA2 must be the AC_VO, and the entire TXOP is restricted by the TXOP Limit of the AC_VO. An Access Category of a PPDU transmitted by the STA1 to the STA3 may be AC_VI (Video), AC_BE (Best Effort) or AC_BK (Background).

To deliver information about the Primary Access Category to STAs through an RTS/CTS frame, it is proposed to encode at least one bit of the scrambling sequence with a QoS parameter such as AC_VO, AC_VI, AC_BE, AC_BK.

Figure 11:
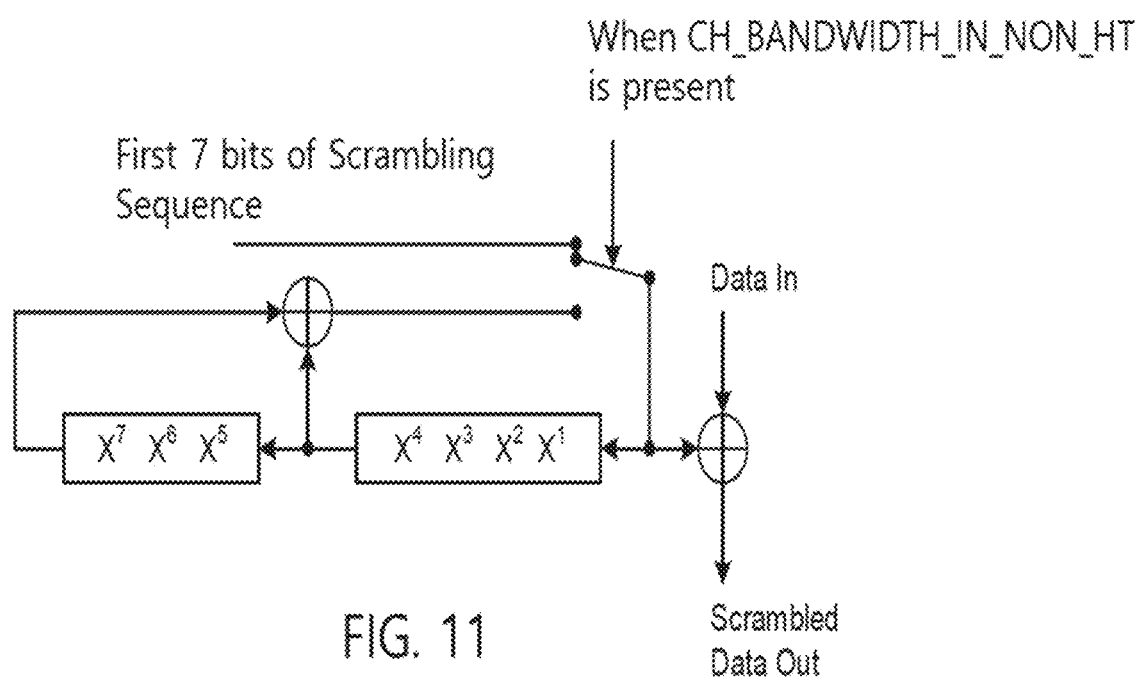
FIG. 11 shows a scrambling procedure for a data field in a PPDU.

FIG. 11 shows a scrambling procedure for a data field in a PPDU.

A data field in a PPDU may be scrambled with a length-127 frame-synchronous scrambler. The data field includes at least one PDSU. The octets of the PSDU are placed in the transmit serial bit stream, bit 0 first and bit 7 last. The 127-bit sequence generated repeatedly by the scrambler shall be (leftmost used first), 00001110 11110010 11001001 00000010 00100110 00101110 10110110 00001100 11010100 11100111 10110100 00101010 11111010 01010001 10111000 1111111. The same scrambler is used to scramble transmit data and to descramble receive data. If the parameter CH_BANDWIDTH_IN_NON_HT is not present, the initial state of the scrambler may be set to a pseudo-random nonzero state. If the parameter CH_BANDWIDTH_IN_NON_HT is present, the first 7 bits of the scrambling sequence may be set as shown in following table.

TABLE 2

| First 7 bits of Scrambling Sequence | | | | | | |
|---|---|---|---|---|---|---|
| B0 | B1 | B2 | B3 | B4 | B5 | B6 |
| Primary Access Category | | | | | CH_BANDWIDTH_IN_NON_HT | |

Since the first 7 bits of the scrambling sequence are used as a scrambling initial seed, at least 2 bits may be set to a value indicating the Primary Access Category.

When a Primary Access Category of a corresponding TXOP is known through an RTS frame, a destination STA can respond with a CTS frame by setting the Primary Access Category to the same value.

Figure 12:
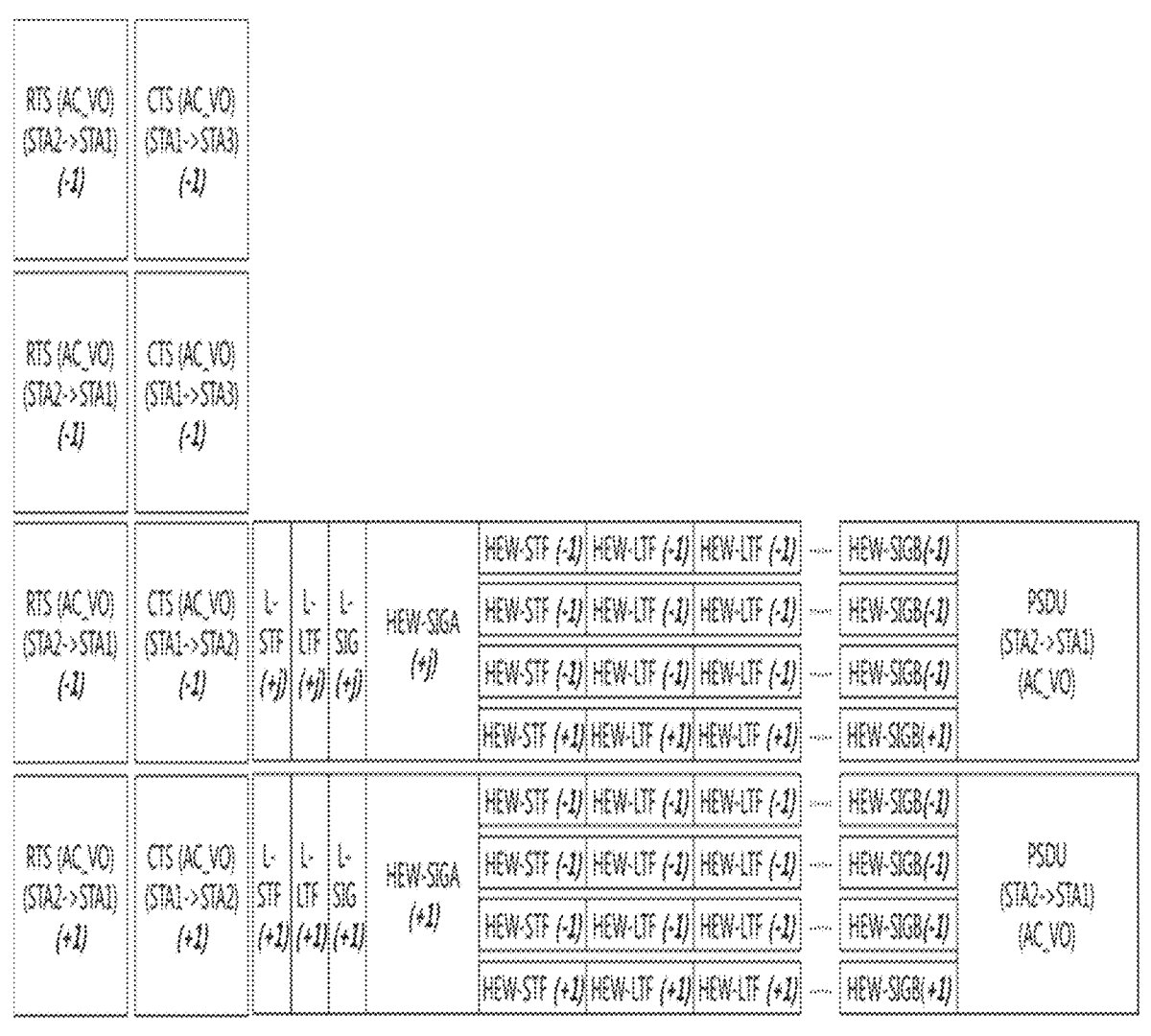

FIG. 12 shows an example of HEW PPDU transmission having an RTS/CTS bandwidth signal.

This is a case where an STA1 responds with a CTS frame to an STA2 and an STA3, but the STA3 fails to successfully receive the CTS frame. The STA2 acquires the TXOP and the STA1 is the destination STA.

If the STA3 fails to successfully receive the CTS frame, the STA3 does not transmit a data frame to the STA1. As such, if an error occurs in the middle of TXOP, the data frame is not transmitted in a channel allocated to the STA3. In order to utilize the channel not used by the STA3, the STA1 and the STA2 may perform a PCF Interframe Space (PIFS) recovery procedure on all of a primary channel and secondary channels to determine again a channel bandwidth to be used at a later time.

Figure 13:
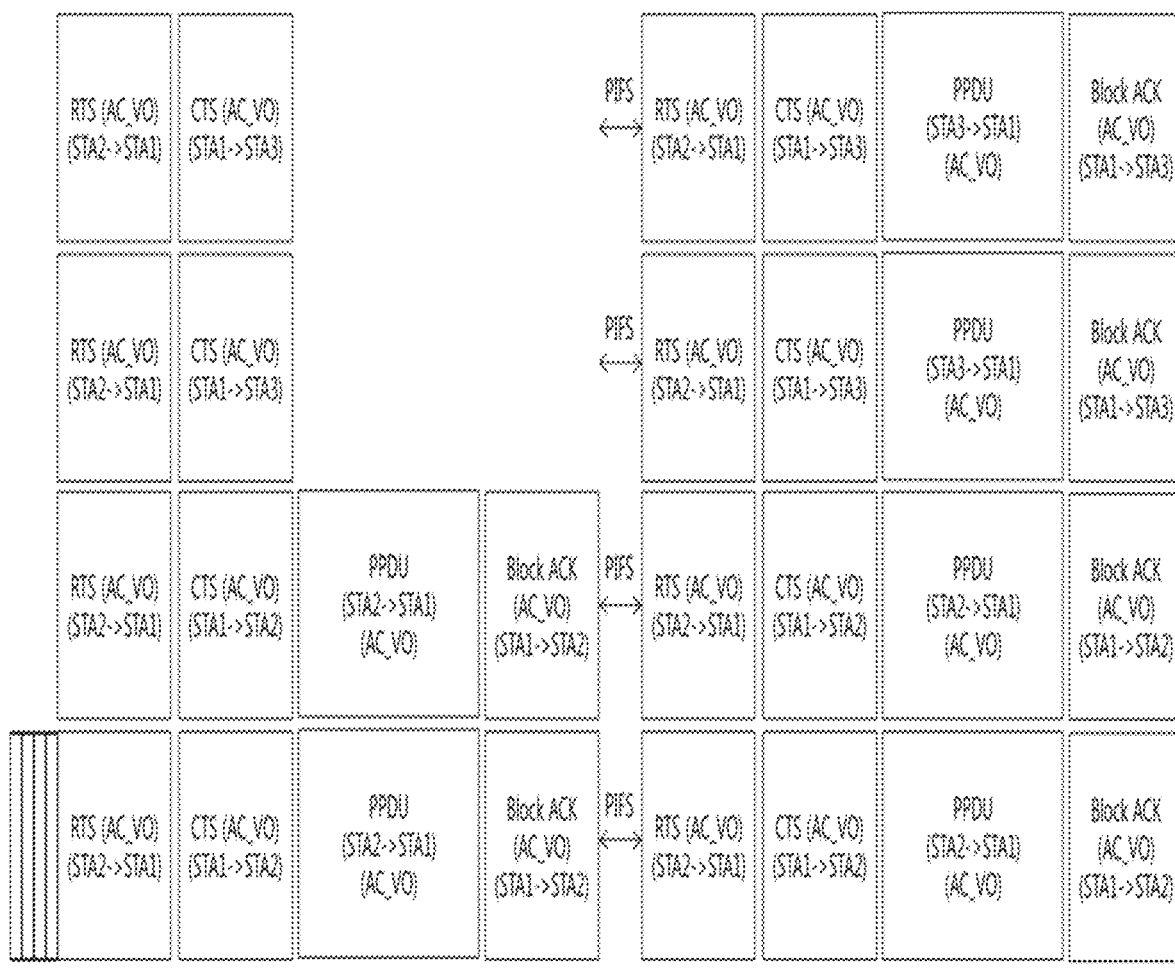
FIG. 13 shows a PIFS Recovery procedure performed after a frame error occurs in the middle of TXOP.

FIG. 13 shows a PIFS Recovery procedure performed after a frame error occurs in the middle of TXOP.

An STA2 acquires TXOP through a Back-off timer of an AC_VO, and subsequently transmits an RTS frame to an STA1. The STA1 responds with a CTS frame to the STA2 and an STA3 by using different channels. The STA2 which has successfully received the CTS frame transmits a PPDU to the STA1 by using a bandwidth signal included in the CTS frame and a channel through which the CTS frame is received. Further, a Block ACK frame is received from the STA1 as a response, and a feedback for data frame transmission is received.

However, the STA3 which fails to successfully receive the CTS frame does not transmit any PPDU to the STA1.

The STA1 which cannot receive any data frame from the STA3 requests the STA2, i.e., a TXOP owner, to perform a PIFS Recovery for the purpose of re-allocating to another STA a channel allocated to the STA3. Such a request may be signaled through a Block ACK frame transmitted by the STA1 to the STA2. The STA2 which receives a request for performing the PIFS Recovery from the STA1 may determine whether a channel state is an idle/busy state by performing a CCA process during a PIFS time with respect to a primary channel and secondary channels.

If the STA1 has a right of the TXOP owner (e.g., the STA1 is a RD responder in reverse direction protocol), the STA1 may perform the CCA process during a PIFS time with respect to a primary channel and secondary channels. It means that a STA operating in the OFDMA mode performs the PIFS Recovery for the purpose of re-allocating a channel during a TXOP, irrespective of the success of the transmitted HEW PPDU.

In FIG. 13, all 80 MHz channels are idle, and the STA2 transmits again an RTS frame in the 80 MHz channel. A destination STA, i.e., the STA1, responds with a CTS frame to the STA2 and the STA3 through respective different channels, and thus provides the STA3 an opportunity of simultaneously transmitting an HEW PPDU independently in a corresponding channel one more time. In this time, the STA3 which has successfully received the CTS frame also transmits a PPDU to the STA1 by using a bandwidth signal included in the CTS frame and a channel through which a CTS frame is received. Further, a Block ACK frame is received from the STA1 as a response, and a feedback for data frame transmission is received.

Figure 14:
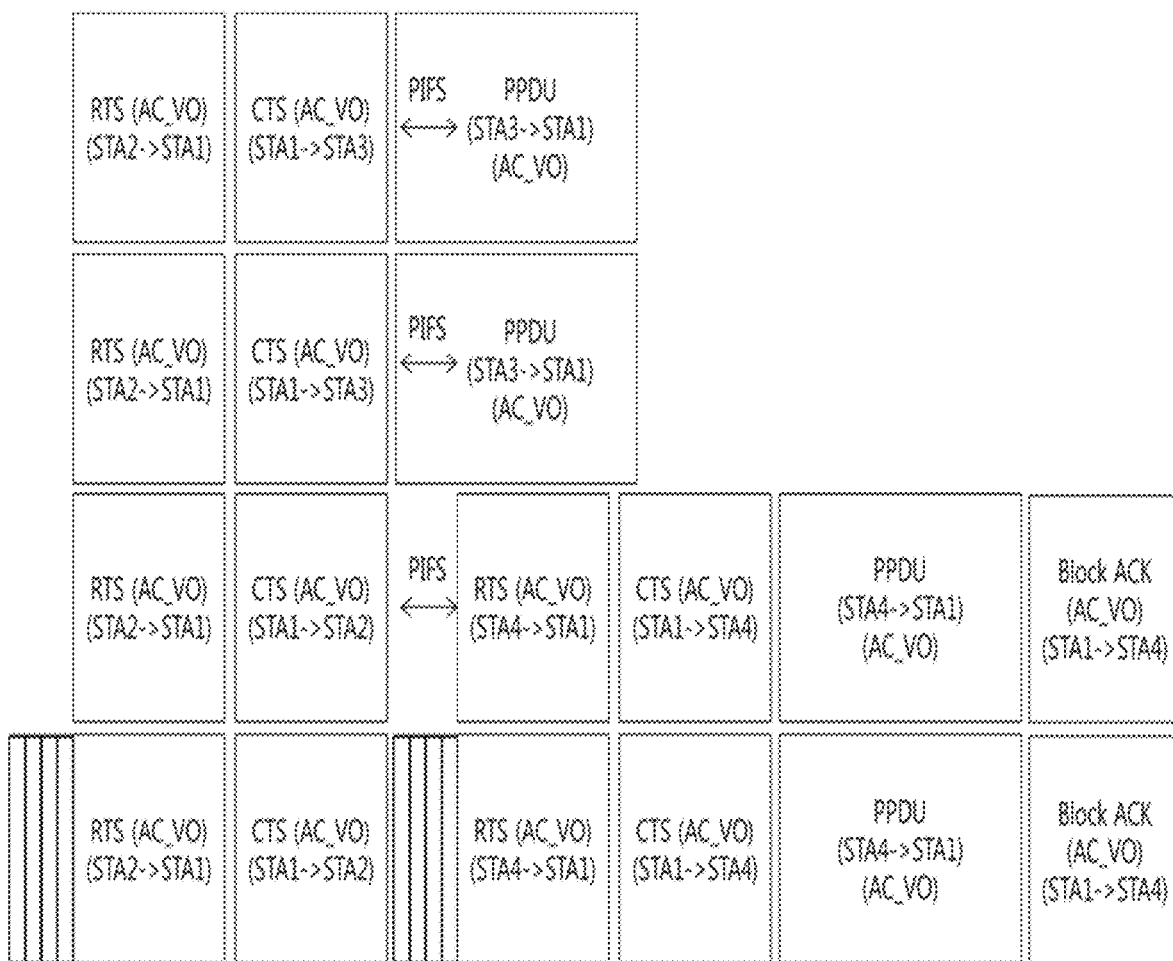
FIG. 14 shows a Recovery procedure when a frame error occurs.

FIG. 14 shows a Recovery procedure when a frame error occurs.

An STA2 acquires TXOP through a Back-off timer of an AC_VO, and subsequently transmits RTS frames to an STA1. The STA1 responds with CTS frames to the STA2 and an STA3 by using different channels.

The STA3 which has successfully received the CTS frame transmits a PPDU to the STA1 by using a bandwidth signal included in the CTS frame and a channel through which the CTS frame is received.

However, the STA2 which fails to successfully receive the CTS frame does not transmit any PPDU to the STA1. Since the STA2 corresponding to a TXOP owner does not use a primary channel, all STAs including the STA2 perform a Back-off mechanism again, and in the above figure, an STA4 can newly obtain TXOP and transmit RTS frames to the STA1. However, since the STA3 is currently transmitting a 40 MHz PPDU, a corresponding channel state is busy, and thus the RTS frames of the STA4 can be transmitted only through a 40 MHz channel including a primary channel. This is a case where the STA1 receives PPDUs from the STA2 and also receives the RTS frames from the STA4.

In an embodiment, a STA can stop receiving of a frame which is currently being received in secondary channels when a certain frame is received in its primary channel while another frame is received in the secondary channels. A capture effect is a scheme of immediately stopping receiving of a frame currently being received upon receiving of a signal having strength greater by a specific level than or equal to received signal strength of a frame currently being received in the same channel. The proposed method extends such a concept of the capture effect, which means that receiving of a certain frame is immediately stop irrespective of reception signal strength of a frame currently being received in secondary channels, when the certain frame is received in its primary channel during the certain frame is received in the secondary channels.

In FIG. 14, the STA1 which has successfully received an RTS frame from the STA4 responds with a CTS frame to the STA3, and subsequently, the STA4 starts to transmit a PPDU to the STA1.

Figure 15:
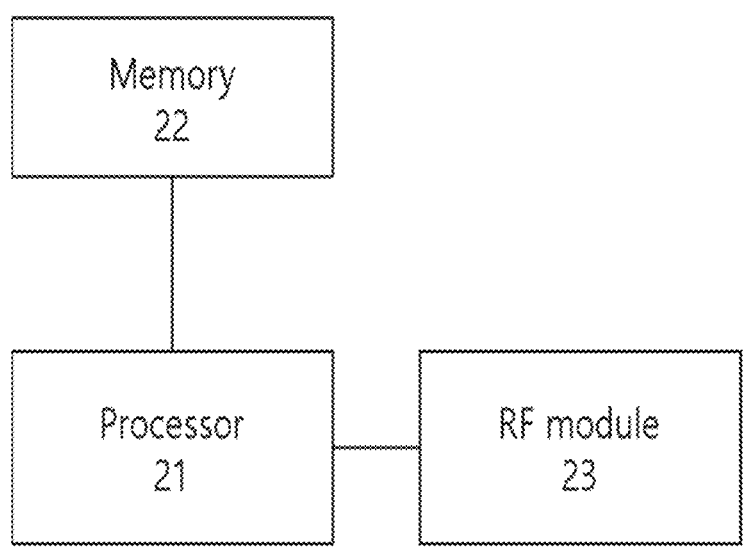
FIG. 15 is a block diagram of an STA according to an embodiment of the present invention.

FIG. 15 is a block diagram of an STA according to an embodiment of the present invention.

The STA may include a processor 21, a memory 22, and a Radio Frequency (RF) module 23.

The processor 21 implements an operation of the STA according to the embodiment of the present invention. The processor 21 may generate a PPDU according to an embodiment of the present invention and may instruct the RF module 23 to transmit the PPDU. The memory 22 stores instructions for the operation of the processor 21. The stored instructions may be executed by the processor 21 and may be implemented to perform the aforementioned operation of the STA. The RF module 23 transmits and receives a radio signal.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for communicating in a local area network, the method comprising:
    transmitting, at an access point (AP), a request frame to a plurality of stations, the request frame transmitted at a first instant,
    wherein the request frame requests the plurality of stations to transmit a physical layer protocol data units (PPDUs) in response to the request frame, the request frame including a clear channel assessment (CCA) signal, the CCA signal instructing each station to perform CCA before transmitting its responsive PPDU; and
    receiving, at the AP, the plurality of responsive PPDUs from the plurality of stations, each responsive PPDU received over sub-channels for which CCA were performed within a predetermined period of time following the first instant,
    wherein each responsive PPDU is generated based on an access category (AC) selected by its transmitting station, and
    wherein a transmission opportunity (TXOP) for the plurality of responsive PPDUs is restricted by a TXOP limit of a primary AC that is used to gain access to at least one sub-channel.

2. The method of claim 1, wherein a responsive PPDU is not transmitted by any station when any one of the CCA tested sub-channels is not idle.

3. The method of claim 1, wherein each sub-channel has a bandwidth of 20 MHz.

4. The method of claim 1, wherein the request frame includes information indicating the at least one sub-channel over which CCA is to be performed.

5. The method of claim 1, wherein the predetermined period of time is at least equal to an inter frame space (IFS).

6. A device comprising:
    a processor; and
    memory disposed to said processor, said memory comprising instructions that, when executed by said processor, causes the device to:
        transmit a request frame to a plurality of stations, the request frame transmitted at a first instant,
        wherein the request frame requests the plurality of stations to transmit a physical layer protocol data units (PPDUs) in response to the request frame, the request frame including a clear channel assessment (CCA) signal, the CCA signal instructing each station to perform CCA before transmitting its responsive PPDU; and
        receive the plurality of responsive PPDUs from the plurality of stations, each responsive PPDU received over sub-channels for which CCA were performed by a corresponding station within a predetermined period of time following the first instant,
        wherein each responsive PPDU is generated based on an access category (AC) selected by its transmitting station, and
        wherein a transmission opportunity (TXOP) for the plurality of responsive PPDUs is restricted by a TXOP limit of a primary AC that is used to gain access to at least one sub-channel.

7. The device of claim 6, wherein a responsive PPDU is not transmitted by any station when any one of the CCA tested sub-channels is not idle.

8. The device of claim 6, wherein each sub-channel has a bandwidth of 20 MHz.

9. The device of claim 6, wherein the request frame includes information indicating the at least one sub-channel over which CCA is to be performed.

10. The device of claim 6, wherein the predetermined period of time is at least equal to an inter frame space (IFS).

* * * * *